United States Patent
Stover et al.

(10) Patent No.: US 10,657,698 B2
(45) Date of Patent: May 19, 2020

(54) TEXTURE VALUE PATCH USED IN GPU-EXECUTED PROGRAM SEQUENCE CROSS-COMPILATION

(71) Applicant: Microsoft Technology Licensing, LLC, Redmond, WA (US)

(72) Inventors: Aaron Blake Stover, Sammamish, WA (US); Matthew Gordon, Redmond, WA (US); Eric David Heutchy, Carnation, WA (US); Ke Deng, Sammamish, WA (US); Warren Lee Burch, Redmond, WA (US); Roger John Perkins, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 213 days.

(21) Appl. No.: 15/862,870

(22) Filed: Jan. 5, 2018

(65) Prior Publication Data
US 2018/0374254 A1 Dec. 27, 2018

Related U.S. Application Data

(63) Continuation-in-part of application No. 15/630,797, filed on Jun. 22, 2017, now Pat. No. 10,289,393.

(Continued)

(51) Int. Cl.
*G06T 15/00* (2011.01)
*G06F 9/455* (2018.01)

(52) U.S. Cl.
CPC .......... *G06T 15/005* (2013.01); *G06F 9/4552* (2013.01)

(58) Field of Classification Search
CPC .................................. G06F 8/51; G06F 8/52
See application file for complete search history.

(56) References Cited

U.S. PATENT DOCUMENTS 6,825,851 B1* 11/2004 Leather ............. G09G 5/026
345/426
7,616,206 B1* 11/2009 Danilak ............ G06F 15/16
345/505

(Continued)

FOREIGN PATENT DOCUMENTS

CN 103389908 A 11/2013
EP 2109304 A1 10/2009

OTHER PUBLICATIONS

Advanced Micro Devices, Inc., R700—Family Instruction Set Architecture, Reference Guide (2011). (Year: 2011).*

(Continued)

*Primary Examiner* — Andrew M. Lyons
(74) *Attorney, Agent, or Firm* — Alleman Hall Creasman & Tuttle LLP

(57) ABSTRACT

A computing system configured to execute instructions for a first graphical processing unit (GPU) on a second GPU is provided. The computing system may include the second GPU and a processor. The processor may be configured to receive second GPU state data that indicates one or more global properties of the second GPU. The processor may be further configured to receive one or more binary instructions for texture operation configured to be executed on the first GPU. Based on the second GPU state data, the processor may be further configured to apply a texture value patch to the one or more binary instructions. Applying the texture value patch may translate the one or more binary instructions into one or more translated binary instructions configured to be executed on the second GPU.

17 Claims, 13 Drawing Sheets

Related U.S. Application Data

(60) Provisional application No. 62/530,783, filed on Jul. 10, 2017.

(56) References Cited

U.S. PATENT DOCUMENTS

| | | | | |
|---|---|---|---|---|
| 7,649,533 | B2* | 1/2010 | Engel | G06T 15/04 345/419 |
| 7,746,347 | B1* | 6/2010 | Brown | G06T 15/005 345/426 |
| 8,854,368 | B1* | 10/2014 | Russell | G06T 15/005 345/426 |
| 9,881,351 | B2* | 1/2018 | Spanton | G06T 1/20 |
| 9,928,637 | B1* | 3/2018 | Corliss | G06T 1/60 |
| 10,102,015 | B1* | 10/2018 | Gordon | G06F 9/4552 |
| 10,388,063 | B2* | 8/2019 | Fuller | G06T 15/005 |
| 2001/0024206 | A1* | 9/2001 | Kobayashi | G06T 15/04 345/582 |
| 2005/0140688 | A1* | 6/2005 | Pallister | G06T 15/005 345/582 |
| 2006/0055695 | A1* | 3/2006 | Abdalla | G06T 11/40 345/426 |
| 2007/0146373 | A1* | 6/2007 | Cool | G06F 9/5044 345/502 |
| 2008/0158236 | A1* | 7/2008 | Bakalash | G06T 15/005 345/506 |
| 2008/0204473 | A1* | 8/2008 | Jackson | G06F 3/14 345/620 |
| 2009/0201363 | A1* | 8/2009 | Grossmann | G02B 27/0093 348/59 |
| 2009/0251748 | A1* | 10/2009 | Luttmer | H04N 1/6025 358/518 |
| 2010/0149194 | A1* | 6/2010 | Yu | G06F 8/41 345/505 |
| 2010/0153934 | A1* | 6/2010 | Lachner | G06F 8/45 717/146 |
| 2010/0214301 | A1* | 8/2010 | Li | G06T 1/20 345/522 |
| 2010/0253690 | A1* | 10/2010 | Rose | G06F 1/3218 345/502 |
| 2011/0067038 | A1* | 3/2011 | Troccoli | G06F 9/455 719/327 |
| 2011/0169844 | A1* | 7/2011 | Diard | G06F 9/451 345/522 |
| 2012/0075316 | A1* | 3/2012 | Kim | G06T 1/20 345/522 |
| 2012/0331277 | A1* | 12/2012 | Teranishi | G06F 9/30076 712/227 |
| 2013/0021353 | A1* | 1/2013 | Drebin | G06F 9/5077 345/522 |
| 2013/0051685 | A1* | 2/2013 | Shechtman | G06T 11/60 382/218 |
| 2013/0159685 | A1* | 6/2013 | Ju | G06F 8/443 712/244 |
| 2013/0297919 | A1* | 11/2013 | Kang | G06F 9/30 712/241 |
| 2014/0035940 | A1* | 2/2014 | Dmitriev | G06T 15/04 345/582 |
| 2014/0146062 | A1* | 5/2014 | Kiel | G06F 11/3664 345/522 |
| 2014/0347371 | A1* | 11/2014 | Stenson | G06T 1/20 345/501 |
| 2014/0347375 | A1* | 11/2014 | Stenson | G06T 1/20 345/522 |
| 2014/0354669 | A1* | 12/2014 | Galazin | G06T 11/001 345/582 |
| 2014/0375658 | A1* | 12/2014 | Lichmanov | G06T 1/20 345/520 |
| 2015/0116335 | A1* | 4/2015 | Chen | G06T 1/20 345/520 |
| 2015/0199787 | A1* | 7/2015 | Pechanec | G06F 9/5044 345/522 |
| 2015/0286491 | A1* | 10/2015 | Anyuru | G06F 8/48 717/148 |
| 2016/0042549 | A1* | 2/2016 | Li | G06T 15/005 345/426 |
| 2016/0117152 | A1* | 4/2016 | Baker | G06T 1/20 717/149 |
| 2016/0210719 | A1* | 7/2016 | Pelton | G06T 1/20 |
| 2016/0328817 | A1* | 11/2016 | Yin | G06T 1/20 |
| 2016/0364216 | A1* | 12/2016 | Howes | G06F 8/41 |
| 2016/0364831 | A1* | 12/2016 | Spanton | G06T 1/20 |
| 2017/0103566 | A1* | 4/2017 | Kang | G06T 15/005 |
| 2017/0116702 | A1* | 4/2017 | Viggers | G06T 1/20 |
| 2017/0228850 | A1* | 8/2017 | Gordon | G06T 1/20 |
| 2018/0121220 | A1* | 5/2018 | Lei | G06F 9/455 |
| 2018/0300844 | A1* | 10/2018 | Liu | G06F 9/3879 |
| 2018/0349062 | A1* | 12/2018 | Sines | G06F 3/0661 |
| 2018/0373513 | A1* | 12/2018 | Gordon | G06F 8/4435 |
| 2018/0373514 | A1* | 12/2018 | Gordon | G06F 8/4441 |

OTHER PUBLICATIONS

Dominé, Sébastien, and John Spitzer. "Texture shaders." NVidia. Developer documentation (2001). (Year: 2001).*

M. Arnold, S. Collange and D. Defour, "Implementing LNS using filtering units of GPUs," 2010 IEEE International Conference on Acoustics, Speech and Signal Processing, Dallas, TX, 2010, pp. 1542-1545. (Year: 2010).*

Farooqui, Naila, Christopher J. Rossbach, and Yuan Yu. "Dynamic Instrumentation and Optimization for GPU Applications." Proceedings of the 4th Workshop on Systems for Future Multicore Architectures. 2014. (Year: 2014).*

T. Ikeda, F. Ino and K. Hagihara, "A code motion technique for accelerating general-purpose computation on the GPU," Proceedings 20th IEEE International Parallel & Distributed Processing Symposium, Rhodes Island, 2006, 10 pp. (Year: 2006).*

Cho, Kyunghyun, "Introduction to Neural Machine Translation with GPUs (part 1)", https://devblogs.nvidia.com/parallelforall/introduction-neural-machine-translation-with-gpus/, Published on: May 27, 2015, 7 pages.

"A Generic and Flexible Shader Cross Compiler Library/Tool", Retrieved from <<https://github.com/lotsopa/Savvy>>, Aug. 27, 2015, 2 Pages.

"AMD GCN3 ISA Architecture Manual", Retrieved from <<https://gpuopen.com/compute-product/amd-gcn3-isa-architecture-manual/>>, Aug. 2016, 2 Pages.

"Cross Platform Shaders in 2014", Retrieved from <<https://aras-p.info/blog/2014/03/28/cross-platform-shaders-in-2014/>>, Mar. 28, 2014, 5 Pages.

"Halide Cross-Compilation for GPU", Retrieved from <<https://stackoverflow.com/questions/42651785/halide-cross-compilation-for-gpu>>, Retrieved Date: May 16, 2017, 2 Pages.

"NVIDIA CUDA", Retrieved from <<http://moss.csc.ncsu.edu/~mueller/cluster/nvidia/2.3/cudatoolkit_release_notes_linux.txt>>, Jun. 18, 2010, 3 Pages.

"Unity Manual", Retrieved from <<https://docs.unity3d.com/530/Documentation/Manual/ComputeShaders.html>>, Retrieved Date: May 16, 2017, 4 Pages.

"Why do AGAL Shaders Need to be Compiled Just-In-Time?", Retrieved from <<https://stackoverflow.com/questions/23602735/why-do-agal-shaders-need-to-be-compiled-just-in-time>>, May 12, 2014, 1 Page.

Bjørge, Marius, "Porting a Graphics Engine to the Vulkan API", Retrieved from <<https://community.arm.com/graphics/b/blog/posts/porting-a-graphics-engine-to-the-vulkan-api>>, Feb. 16, 2016, 8 Pages.

Farooqui, et al., "Dynamic Instrumentation and Optimization for GPU Applications", In Proceedings of the 4th Workshop on Systems for Future Multicore Architectures, Apr. 13, 2014, 6 pages.

Nickolls, et al., "Graphics and Computing GPUs", In Book Computer Organization and Design: The Hardware/Software Interface, 4th Edition, Nov. 17, 2008, 82 Pages.

(56) References Cited

OTHER PUBLICATIONS

Thacker, Jim, "Otoy is Cross-Compiling CUDA for non-Nvidia GPUs", Retrieved from <<http://www.cgchannel.com/2016/03/otoy-is-reverse-engineering-cuda-for-non-nvidia-gpus/>>, Mar. 11, 2016, 6 pages.
"Non Final Office Action Issued in U.S. Appl. No. 15/630,797", dated Apr. 24, 2018, 10 Pages.
"Non Final Office Action Issued in U.S. Appl. No. 15/630,818", dated May 3, 2018, 12 Pages.
"Notice of Allowance Issued in U.S. Appl. No. 15/630,836", dated Jun. 19, 2018, 10 Pages.

* cited by examiner

TEXTURE VALUE PATCH USED IN GPU-EXECUTED PROGRAM SEQUENCE CROSS-COMPILATION

CROSS REFERENCE TO RELATED APPLICATIONS

This application claims priority to U.S. Provisional Patent Application Ser. No. 62/530,783, filed Jul. 10, 2017, and is a Continuation-in-Part of U.S. patent application Ser. No. 15/630,797, filed Jun. 22, 2017, the entirety of which are hereby incorporated herein by reference for all purposes.

BACKGROUND

When a program is executed on a graphics processing unit (GPU), the program is typically executed as part of a sequence of programs. For example, program A may be sequenced with program B or C. When the sequence is (A, B), A is "bound" to B. When the sequence is (A, C), A is "bound" to C. When a program is bound into a particular sequence, the program may communicate with the other programs differently from in other possible sequences. For example, the program may decode or encode its inputs and/or outputs differently. The rules of sequence binding may be determined at least in part by GPU architecture.

SUMMARY

According to one aspect of the present disclosure, a computing system is provided, which is configured to execute instructions for a first graphical processing unit (GPU) on a second GPU. The computing system may include the second GPU and a processor. The processor may be configured to receive second GPU state data that indicates one or more global properties of the second GPU. The processor may be further configured to receive one or more binary instructions for a texture operation configured to be executed on the first GPU. Based on the second GPU state data, the processor may be further configured to apply a texture value patch to the one or more binary instructions. Applying the texture value patch may translate the one or more binary instructions into one or more translated binary instructions configured to be executed on the second GPU.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

It may sometimes be desirable to execute an application program originally written to be executed on a first GPU on a second GPU. However, programs sent to the second GPU may not be compiled to run on the second GPU due to differences in how the first GPU and the second GPU handle program binding. A computing system is described herein that addresses this issue.

Figure 1:
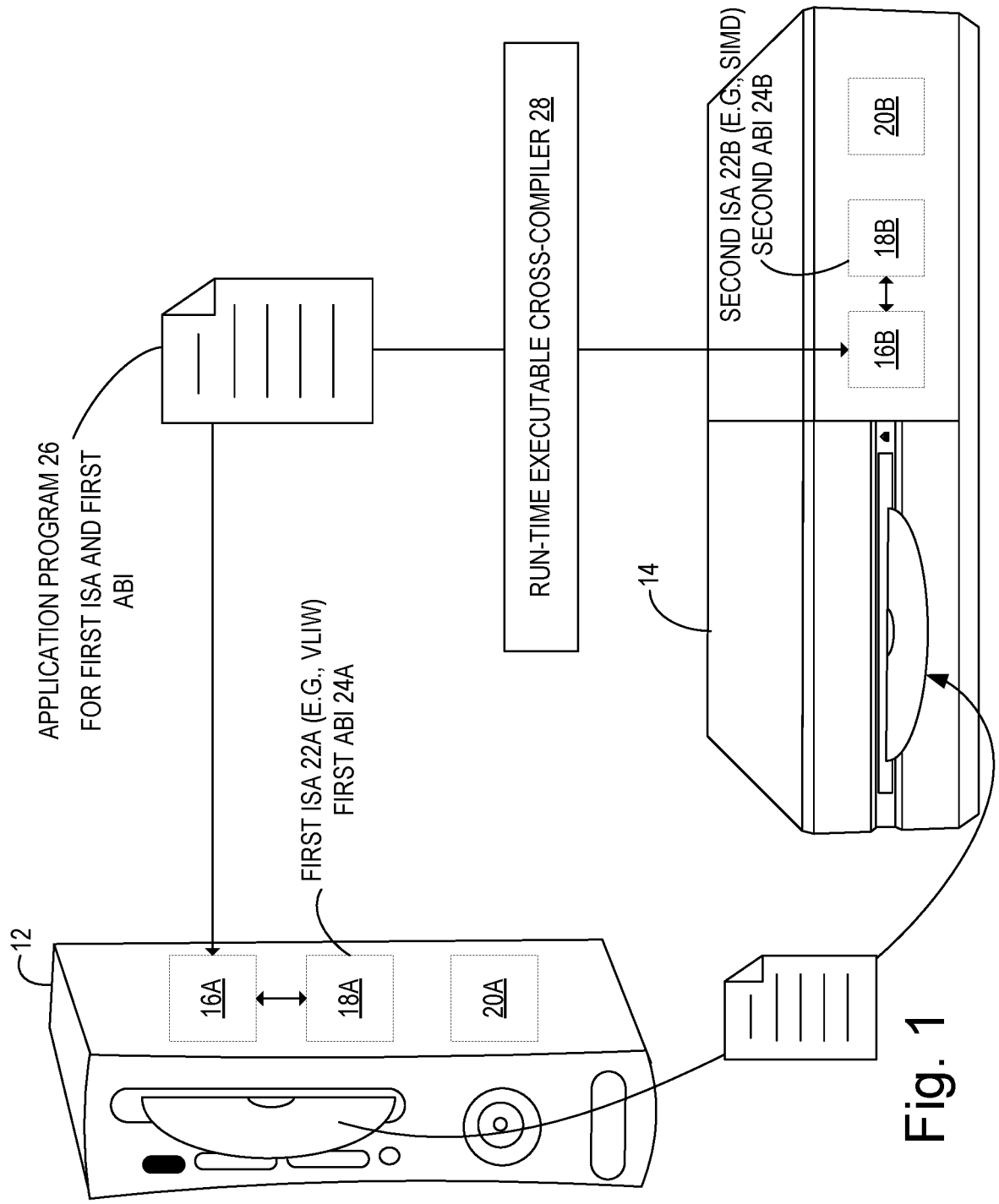
FIG. 1 illustrates a first computing device and a second computing device in the form of gaming consoles, according to one embodiment of the present disclosure.

FIG. 1 illustrates a first computing device 12 and a second computing device 14 in the form of gaming consoles. The first computing device 12 includes a first processor 16A, a first graphical processing unit (GPU) 18A, and other computing parts 20A including volatile memory, non-volatile memory, a power supply unit, etc. Similarly, the second computing device 14 includes a second processor 16B, a second GPU 18B, and other computing parts 20B. The respective processors and GPUs of the first and second computing devices 12 and 14 are configured to execute application programs, such as, for example, a game application. Additionally, the first and second computing devices 12 and 14 may take other suitable forms, such as, for example, desktop computers, laptops, head mounted display devices, etc.

In one example, the first GPU 18A of the first computing device 12 is architecturally distinct from the second GPU 18B of the second computing device 14. As shown in FIG. 1, the first GPU 18A has a first instruction set architecture (ISA) 22A and a first application binary interface (ABI) 24A, while the second GPU 18B has a second ISA 22B and a second ABI different from the first ISA 22A and first ABI 24A of the first GPU 18A. Due to architectural differences between the first GPU 18A and the second GPU 18B, application programs configured to be executed using the first processor 16A and first GPU 18A may not be successfully executed using the second processor 16B and second GPU 18B, and vice versa. For example, a compiled binary of an application program 26 may utilize GPU-executed programs configured to be executed on the first GPU 18A having the first ISA 22A and the first ABI 24A. Thus, as the compiled binary of the application program 26 was configured for the specific architecture of the processor 16A and GPU 18A of the first computing device 12, the application program 26 may be run natively on the first computing device 12 without needing modifications. However, the same compiled binary of the application program 26 is not binary compatible with the second ISA 22B and second ABI 24B of the second GPU 18B of the second computing device 14. Thus, the application program 26 will not successfully be executed on the second computing device 14 without modification.

In one specific example, the first ISA 22A may be an instruction-level parallelism, Very Long Instruction Word (VLIW) type of ISA. In an example VLIW ISA, a single instruction may consume up to twelve inputs and produce up to four outputs. Additionally, in the example VLIW ISA, a general purpose register (GPR) is a group of four individually addressable elements, and thus instructions may consume input from up to three GPR inputs and output to one GPR. The GPRs are generally equivalent, although some special purpose registers do exist. Memory operations are implemented by special instructions referencing special purpose hardware registers, and memory transactions appear as if they are completed instantly. The example VLIW ISA also expresses a further degree of explicit pipeline-parallelism in the form of instruction co-issues, where a first family of instructions may be concurrently issued with a second family of instructions, with co-mingled register usage.

On the other hand, the second ISA 22B may be a Simultaneous Instruction Multiple Data (SIMD) type of ISA where the same program is executed concurrently in lock-step on multiple streams of data. A typical instruction for an example SIMD ISA may consume up to three inputs and produces one output. In contrast to the example VLIW ISA, the GPRs of the example SIMD ISA are singular. Thus, instructions in the example SIMD ISA may consume input from up to three GPRs and output results to one GPR. In the example SIMD ISA, there are two families of GPR, each having different parallelism properties. Additionally, memory operations occur by special operations consuming GPRs, and memory transactions are initiated and then explicitly completed. In the example SIMD ISA, instruction parallelism is implicit in contrast to the explicit pipeline-parallelism of the example VLIW ISA.

Due to the differences in architecture and design discussed above, application programs utilizing GPU-executed programs specified for the example VLIW ISA and a corresponding ABI are not binary compatible with the SIMD ISA and a corresponding ABI. However, by taking these known differences into account, instructions for the example VLIW ISA may be translated to instructions for the example SIMD ISA via rules mapping. As illustrated in FIG. 1, the processor 16B of the second computing device 14 may execute a run-time executable cross compiler 28 configured to translate the compiled binary of the application program 26 such that the application program 26 may be executed by the processor 16B and GPU 18B of the second computing device 14. It will be appreciated that the above VLIW and SIMD examples for the first and second ISAs 22A and 22B and first and second ABIs 24A and 24B are merely exemplary, and that other types of binary incompatible ISAs and ABIs not specifically mentioned above may also be translated between by the computer implemented processes and methods, including the run-time executable cross-compiler 28, described herein.

Figure 2:
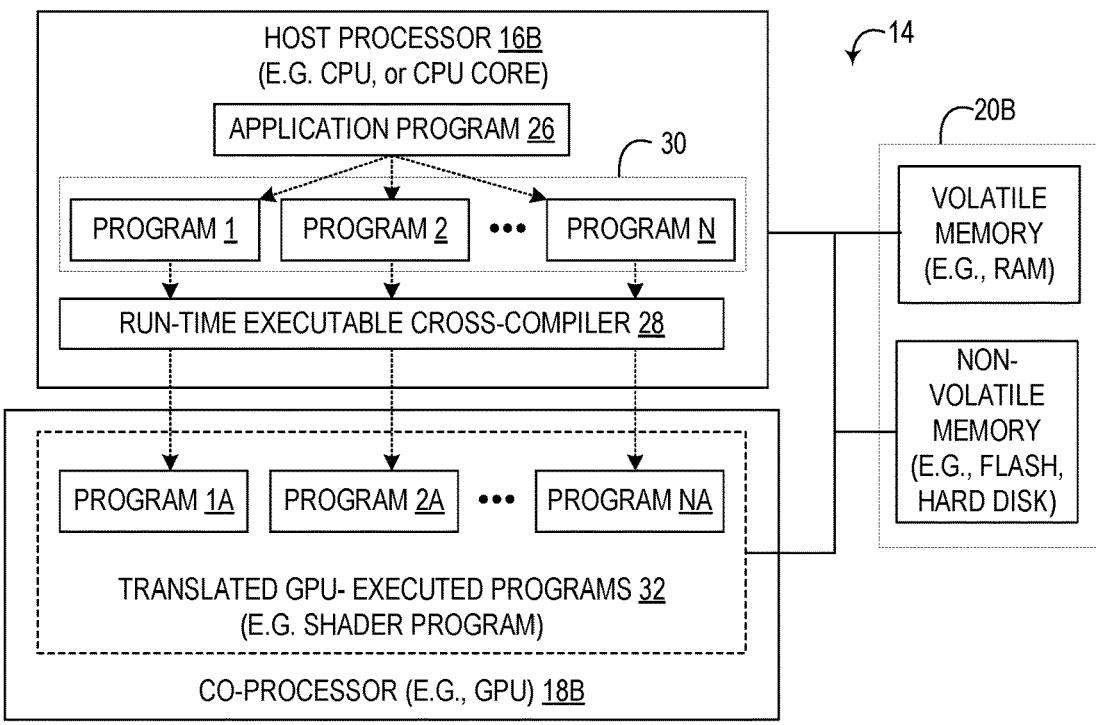
FIG. 2 illustrates an example computing device, according to the embodiment of FIG. 1.

FIG. 2 illustrates an example computing device, such as the second computing device 14, for just-in-time cross-compiling compiled binaries of application programs that utilize GPU-executed programs configured to be executed on a first GPU 18A having a first ISA 22A and a ABI 24A. As illustrated, in FIGS. 1 and 2, the second computing device 14 includes a co-processor, such as the second GPU 18B, having the second ISA 22B and second ABI 24B different from the first ISA 22A and first ABI 22B of the first GPU 18A. The second computing device 14 further includes a host processor, such as the second processor 16B, configured to execute an application program 26 that utilizes a plurality of GPU-executed programs 30 configured to be executed for the first ISA 22A and first ABI 24A of the first GPU 18A of the first computing device 12.

However, as discussed above, the plurality of GPU-executed programs 30 that are specified for the first ISA 22A and first ABI 24A cannot be executed by the second GPU 18B having the second ISA 22B and second ABI 24B without translation. Thus, the second processor 16B is further configured to execute a run-time executable cross-compiler 28 configured to, while the application program 26 is being executed, translate compiled binary of the plurality of GPU-executed programs 30 from the first ISA 22A to the second ISA 22B.

As illustrated in FIG. 2, GPU-executed programs, such as shader programs, are typically executed in a sequence of GPU-executed programs using a successive execution model. Thus, for an example rendering pipeline, the application program 26 may utilize a plurality of GPU-executed programs 30 arranged in a sequence, such as in the sequence program 1, program 2, . . . , program N, illustrated in FIG. 2. The successive execution model creates semantic bindings between these programs in the sequence. When 'bound' into a particular sequence, a single GPU-executed program may continue to express the same semantics, but may modify how it communicates with peer GPU-executed programs in the sequence. For example, each GPU-executed program in the sequence may decode/encode inputs and outputs differently depending upon the other GPU-executed programs in the sequence. As another example, a GPU-executed program may elide specific outputs entirely, or ma assume 'default' values for specific inputs, depending upon the other GPU-executed programs in the sequence. As yet another example, the specific in-memory resources (data) that each GPU-executed program references including the exact input and output behavior is a function of the particular sequence of plurality of GPU-executed programs 30 and resources set. The particular rules of sequence and resource binding are a function of the GPU architecture and software stack, and may vary between GPU architectures.

The run-time executable cross-compiler 28 executed by the second processor 16B of the second computing device 14 is configured to translate a GPU-executed program compiled and bound for the first GPU 16A of the first computing device 12, such that the translated GPU-executed program meets all of the requirements and constraints of the second GPU 18B of the second computing device 14 when sequenced with a particular set of peers and resources. That is, the compiled binary of the application program 26 includes sequences of GPU-executed programs 30 that have already been compiled and bound according to the requirements and constraints of the first GPU 18A having the first ISA 22A and first ABI 24A. However, the requirements and constraints of the first GPU 18A are not the same as for the second GPU 18B due to architectural differences.

Thus, the run-time executable cross-compiler 28 analyzes a particular sequence of a plurality of GPU-executed programs 30 that are currently about to be executed during run-time of the application program 26, to determine summary data for the sequence including the peers of each GPU-executed program in the sequence, metadata that is stable with respect to GPU-executed program bindings in the sequence, and weakly bound data resources used during execution of the sequence. The run-time executable cross-compiler 28 then individually translates each GPU-executed program in the plurality of GPU-executed programs 30 while taking into account the determined summary data, such that the translated GPU-executed program meets all of the requirements and constraints of the second GPU 18B of the second computing device 14 for the particular set of peers and resources in the sequence.

In one example, the run-time executable cross-compiler 28 delays cross-compilation and translation of individual GPU-executed programs until a full sequence of a plurality of GPU-executed programs 30 is presented for execution. That is, the run-time executable cross-compiler 28 does not statically discover every GPU-executed program in isolation in the compiled binary of the application program 26. Starting with the compiled binary of a whole conventional program, it is generally not practical to find the embedded shader program listings and the semantics of their utilization. Attempting to do so directly would require statically evaluating all dynamically possible code paths to determine all possible shader programs and their arrangement into pipelines. Such a problem would be a form of the Halting Problem, and therefore would not have a computable solution. Instead, in one example, the run-time executable cross-compiler 28 translates GPU-executed programs, such as shader programs, as they are used by the application program 26 in a just-in-time manner. At the point in time that a GPU-executed program is about to be used by the application program 26, the entire sequence of the plurality of GPU-executed programs 30 is known, and thus does not require static discovery to determine the GPU-executed program and its execution context including the particular bindings in the sequence of GPU-executed programs.

At or near the point in time that a GPU-executed program is to be used by the application program 26, the run-time executable cross-compiler 28 inspects the entire sequence of peers of GPU-executed programs and gathers summary data. For example, when cross-compiling GPU-executed program 'program 1' from the sequence (program 1, program 2) illustrated in FIG. 2, the second GPU 18B→program 1→program 2 binding is fully computed and 'program 1' is translated to the second ISA 22B and second ABI 24B of the second GPU 18B. When 'program 2' is subsequently cross-compiled, the program 1→program 2→second GPU 18B binding is evaluated to exactly compatible results and 'program 2' is cross-compiled. In other words, the run-time executable cross-compiler 28 is stable with respect to a sequence of a plurality of GPU-executed programs 30, not just a single GPU-executed program.

In some examples, it is common for bindings to be compatible. That is, for both of the architectures of the first and second GPUs 18A and 18B, 'program 1' binds identically in the bindings (program 1, program 2) and (program 1, program N). In such circumstances a single cross-compilation of program 1 will be compatible for both bindings (program 1, program 2) and (program 1, program N). Thus, in this example, the run-time executable cross-compiler 28 is configured to identify bindings specific bindings in a sequence. In one specific example, the run-time executable cross-compiler 28 is configured to inspect a sequence of a plurality of GPU-executed programs 30, compute a binding between peer GPU-executed programs in the sequence, and then produce an output translation that is stable with respect to that identified binding. Further in this example, the run-time executable cross-compiler 28 may be configured to cache each cross-compilation result.

As illustrated in FIG. 2, at or near the point in time that a sequence of the plurality of GPU-executed programs 30 is to be utilized by the application program 26 during run-time, the run-time executable cross-compiler 28 translates each GPU-executed program that was compiled and bound for the first GPU 16A of the first computing device 12, such that the translated GPU-executed program meets all of the requirements and constraints of the second GPU 18B of the second computing device 14 including the bindings in the sequence. In the illustrated example, the sequence of GPU-executed programs 30 'program 1, program 2, . . . , program N' is translated to a corresponding sequence of translated GPU-executed programs 32 'program 1A, program 2A, . . . , program NA'. It will be appreciated that while a sequence of GPU-executed programs is translated into a sequence of translated GPU-executed programs having the same number of programs in a 1:1 translation in the example illustrated in FIG. 2, that each GPU-executed program may potentially be translated into any suitable number of translated GPU-executed programs. For example, a single GPU-executed program for the first ISA 22A and first ABI 24A of the first GPU 18A may be translated into zero to N GPU-executed programs for the second ISA 22B and second ABI 24B of the second GPU 18B depending upon the architectural differences between the GPUs.

Figure 3:
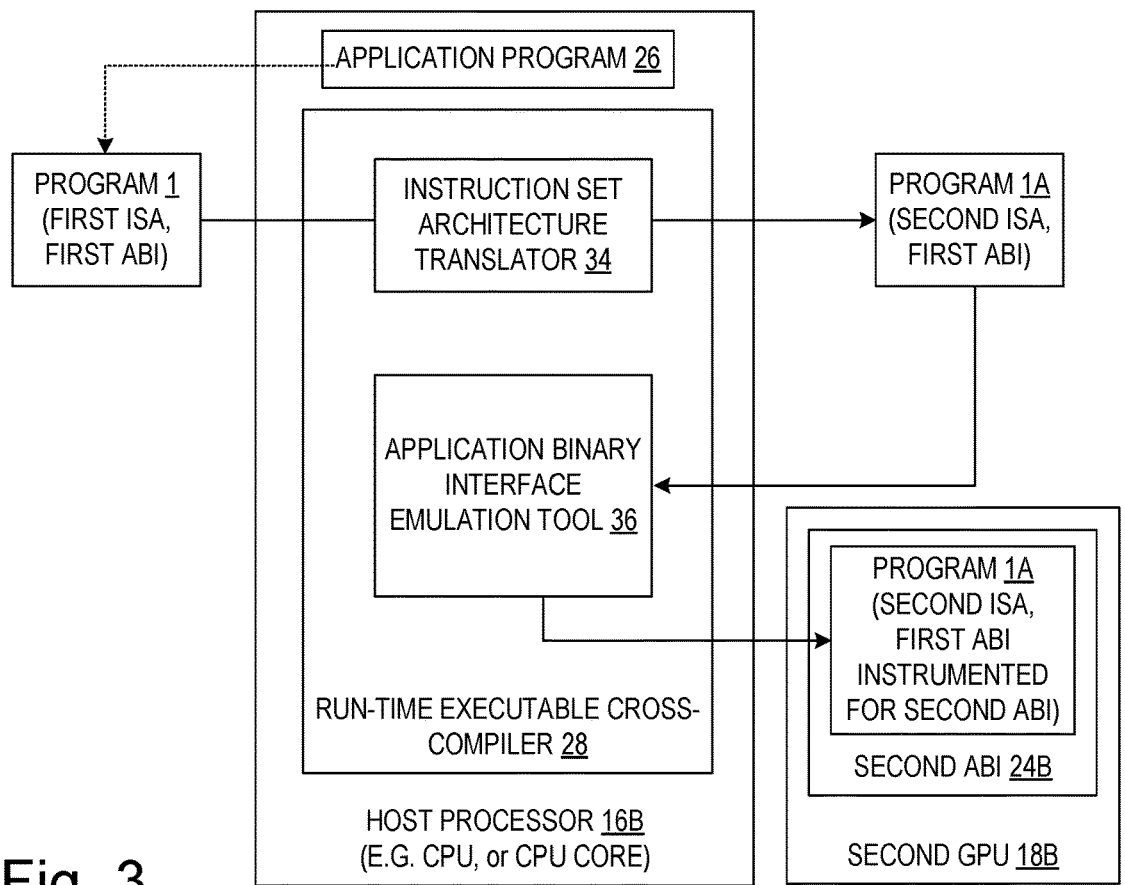
FIG. 3 shows an example run-time executable cross-compiler that includes an ISA translator and an ABI emulation tool, according to the embodiment of FIG. 1.

FIG. 3 shows an example run-time executable cross-compiler 28 that includes an ISA translator 34 and an ABI emulation tool 36. In the illustrated example, a GPU-executed program 'program 1' is processed by the ISA translator 34 of the run-time executable cross-compiler 28. The ISA translator 34 inspects the sequence of the plurality of GPU executed-programs 30 that includes the particular GPU-executed program 'program 1', gathers the summary data discussed above, and then translates the GPU-executed program 'program 1' that was compiled and bound for the first GPU 16A of the first computing device 12, such that the corresponding translated GPU-executed program 'program 1A' meets all of the requirements and constraints of the second GPU 18B of the second computing device 14 including the bindings in the sequence.

In one example, the ISA translator 34 is configured to translate each instruction of the first ISA 22A in the GPU-executed program 'program 1' to a corresponding zero to N instructions of the second ISA 22B based on rules mapping. Depending upon the specific GPU architectures, an instruction in the first ISA 22A does not always have an exact equivalent instruction in the second ISA 22B, such as in the example VLIW and SIMD architectural mismatch discussed previously. Thus, one instruction in the first ISA 22A may expand to zero instructions in the second ISA 22B when, for example, that instruction was peculiar to the hardware architecture of the first GPU 18A, or that instruction may be implicitly performed by the hardware of the second GPU 18B. In another example, one instruction in the first ISA 22A may expand to more than one instructions in the second ISA 22B, when, for example, multiple instructions from the second ISA 22B are required to be performed in sequence to perform a semantically equivalent function to that one instruction of the first ISA 22A.

In one specific example, the ISA translator 34 includes mappings between each instruction in the first ISA 22A and corresponding zero or more instructions in the second ISA 22B. That is, each particular instruction in the first ISA 22A is specifically mapped to zero or more particular instructions in the second ISA 22B, and the ISA translator 34 translates each GPU-executed program according to the mappings. In one example, the mappings are binary instruction to binary instruction. That is, the run-time executable cross-compiler 28 including the ISA translator 34 operates in a binary domain, and is configured to translate the plurality of GPU-executed programs 30 without inflation to an intermediate representation including a control flow graph. Thus, it will be appreciated that the run-time executable cross-compiler 28 is not recompiling source code or generating a higher level code representation and/or control flow graph of the already compiled binary of the GPU-executed programs before producing the translated GPU-executed programs. Rather, in one example, the run-time executable cross-compiler 28 is configured to perform binary-to-binary translations of first ISA 22A instructions of the untranslated GPU-executed program to second ISA 22B instructions for the translated GPU-executed program.

In one example, the run-time executable cross-compiler is configured to translate the plurality of GPU-executed programs 30 without co-mingling first ISA 22A instructions of the plurality of GPU-executed programs 30. That is, the sequence of first ISA 22A instructions in a particular GPU-executed program is not changed during translation by the run-time executable cross-compiler 28. For example, the run-time executable cross-compiler 28 does not rearrange or combine first ISA 22A instructions that will be translated. In one specific example, any given instruction including operands in the first ISA 22A for a GPU-executed program always expands to the same corresponding sequence of instructions for the second ISA 22B. This consistent instruction translation design ensures that the translation from the first ISA 22A to the second ISA 22B may proceed in static program order but operate equivalently for any arbitrary execution order, regardless of data-dependent flow control/execution mask decisions and complexity.

After translation by the ISA translator 34, the translated GPU-executed programs 32 include instructions from the second ISA 22B corresponding to instructions from the first ISA 22A, such that the translated GPU-executed programs 32 may execute to semantically equivalent results in the second GPU 18B as the untranslated GPU-executed programs 30 would execute to with the first GPU 18A. However, the translated GPU-executed programs 32 are still configured according to the rules of the first ABI 24A, such as GPR usage patterns, coordinate system for inputs, encoding, GPR locations, scope of execution, and other characteristics of the first ABI 24A.

Thus, in one example, the run-time executable cross-compiler 28 further includes an ABI emulation tool 36 that is configured to emulate the first ABI 24A using the hardware resources of the second GPU 18B, which includes translating between the first ABI 24A of the first GPU 18A and second ABI 24B of the second GPU 18B at the entry and exit points of the plurality of translated GPU-executed programs 32. In the example illustrated in FIG. 3, the ISA translator 34 translates one GPU-executed program 'program 1' from the first ISA 22A to the second ISA 22B, producing the translated GPU-executed program 'program 1A'. However, the translated GPU-executed program 'program 1A' is still configured according to the rules of the first ABI 24A, such as GPR usage patterns, coordinate system for inputs, encoding, GPR locations, scope of execution, and other characteristics of the first ABI 24A. Thus, without ABI emulation, the translated GPU-executed program 'program 1A' may not correctly execute on the second GPU 18B.

In one example, to emulate the first ABI 24A, the ABI emulation tool 36 of the run-time executable cross-compiler 28 is configured to translate from the second ABI 24B to the first ABI 24A before execution of a translated GPU-executed program 32, and translate from the first ABI 24A to the second ABI 24B after execution of the translated GPU-executed program 32. In this manner, the rules of the first ABI 24A is nested inside the rules of the second ABI 24B. In one specific example, the ABI emulation tool 36 may be configured to rearrange and reassign inputs and outputs to the GPRs of the second GPU 18B to emulate the GPR behavior of the first ABI 24A for the first GPU 18A. In the VLIW vs SIMD ISA example, GPRs in the VLIW ISA and associated ABI is a group of four individually addressable elements, while GPRs in the SIMD ISA and associated ABI is a singular. Thus, to emulate the VLIW and associated ABI GPRs using the SIMD ISA and associated ABI GPRs, the ABI emulation tool 36 may be configured to assign four GPRs of the SIMD ISA together to emulate one GPR of the VLIW ISA. By associating GPRs together in this manner, the ABI emulation tool 36 may emulate the GPR environment and rules of the first GPU 18A using the hardware resources of the second GPU 18B. Similarly, the ABI emulation tool 36 may be configured to emulate each characteristic of the first ABI 24A, such as coordinate system for inputs, encoding, GPR usage patterns, scope of execution, etc., using the rules of the second ABI 24B and the hardware resources of the second GPU 18B.

As discussed above, the ABI emulation tool 36 is configured to translate from the second ABI 24B to the first ABI 24A before execution of a translated GPU-executed program 32, and translate from the first ABI 24A to the second ABI 24B after execution of the translated GPU-executed program 32. By nesting the first ABI 24A inside the second ABI 24B, from the perspective of the sequence of translated GPU-programs 32, they are being executed within a first ABI 24A environment. On the other hand, from the perspective of the hardware of the second GPU 18B, the inputs and outputs to the sequence of translated GPU-programs 32 conforms to the rules and characteristics of the second ABI 24B. That is, each input/communication from the second GPU 18B to the sequence of translated GPU-executed programs 32 conforms to the rules of the second ABI 24B, but are appropriately translated from the second ABI 24B to the first ABI 24A such that a translated GPU-executed program receives input/communication conforming to the rules of the first ABI 24A. Additionally, each output/communication from the sequence of translated GPU-executed programs 32 to the second GPU 18B conforms to the rules of the first ABI 24A, but are appropriately translated from the first ABI 24A to the second ABI 24B such that the hardware/software of the second GPU 18B receives output/communication conforming to the rules of the second ABI 24B.

As illustrated in FIG. 3, after translation by the ISA translator 34 and emulation by the ABI emulation tool 36 of the run-time executable cross-compiler 28, the second processor 16B of the second computing device 14 may proceed to execute the plurality of translated GPU-executed programs 32 on the second GPU 18B. The results of execution of the plurality of translated GPU-executed programs 32 may then be returned to the application program 26 currently being executed.

It will be appreciated that while the example illustrated in FIG. 3 conceptually shows that the ISA translator 34 and the ABI emulation tool 36 operate sequentially, that the run-time executable cross-compiler may execute both steps either concurrently as part of one translation step, or sequentially as shown. In another example, the run-time executable cross-compiler 28 may execute either of the ISA translator 34 and the ABI emulation tool 36 without the other. In one specific example, the ISA of a particular GPU architecture may evolve/change over time while the underlying hardware and ABI remain unchanged. Thus, the run-time executable cross-compiler 28 may be configured to only translate GPU-executed programs from a first ISA to a second ISA, and not translate/emulate between ABIs as the ABI and hardware resources of the GPU have not changed. In another specific example, the drivers of a GPU may be updated such that the current ABI of the GPU is incompatible with the previous ABI of that GPU, without changing the ISA for that GPU. Thus, the run-time executable cross-compiler 28 may be configured to only emulate/translate between a first ABI and a second ABI, and not translate between ISAs as the ISA for that GPU has not changed.

Figure 4:
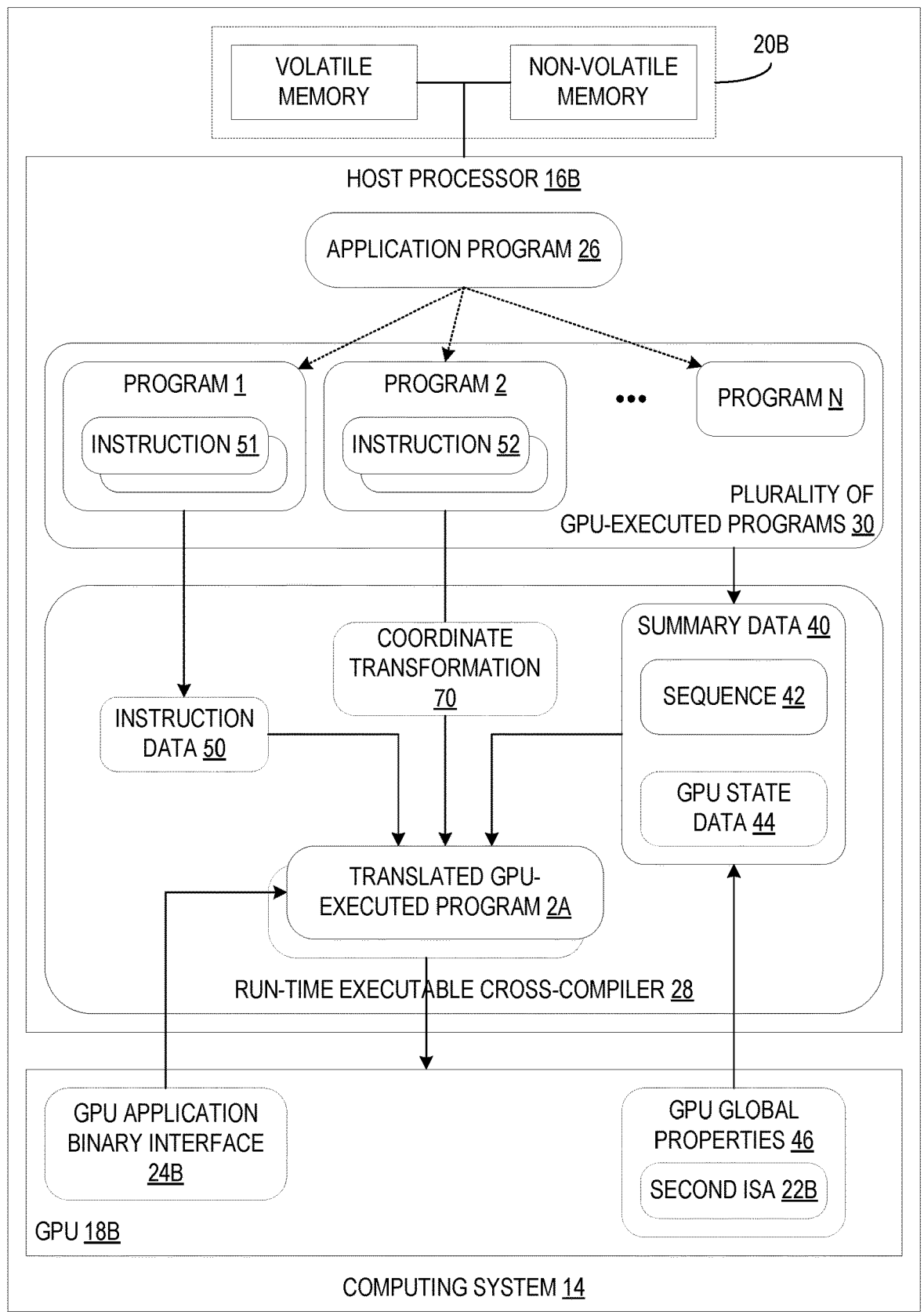
FIG. 4 shows an example computing system including a GPU and a host processor, according to the embodiment of FIG. 1.

The cross-compilation of a sequence of GPU-executed programs is further described below with reference to FIGS. 4-7. Turning now to FIG. 4, a computing system, which may be the computing device 14 of FIG. 1, is shown according to an example embodiment of the present disclosure. The computing system 14 includes a GPU 18B and a host processor 16B configured to execute a run-time executable cross-compiler 28. The host processor 16B is configured to receive a GPU-executed program of a plurality of GPU-executed programs 30. In the example embodiment shown in FIG. 4, the plurality of GPU-executed programs 30 are received from an application program 26 executed by the host processor 16B. Each program of the plurality of GPU-executed programs 30 may include one or more instructions. As shown in FIG. 4, GPU-executed program 1 includes one or more instructions 51 and program 2 includes one or more instructions 52.

The host processor 16B is further configured to receive summary data 40 associated with the GPU-executed program. The summary data 40 includes a sequence 42 in which the plurality of GPU-executed programs 30 are configured to be executed. In some embodiments, the summary data 40 may further include GPU state data 44 that indicates one or more global properties 46 of the GPU 18B. The one or more global properties 46 of the GPU 18B may include an ISA 24B of the GPU 18B that includes a description of operations that may be executed on the GPU 18B. Other data may also be included in the summary data 40.

In some embodiments, the host processor 16B may be further configured to determine instruction data 50 indicating one or more instructions included in at least one other GPU-executed program of the plurality of GPU-executed programs 30. The instructions may be encoded in the first ABI 24A, as shown in FIG. 2. In such embodiments, the host processor 16B may be further configured to determine instruction data 50 for each GPU-executed program of the plurality of GPU-executed programs 30. Embodiments in which the host processor 16B is configured to determine instruction data 50 for at least one other GPU-executed program of the plurality of GPU-executed programs 30, but not for each GPU-executed program, are also contemplated.

Based at least in part on the GPU-executed program and the summary data 40, the host processor 16B is further configured to generate a translated GPU-executed program. As shown in FIG. 4, translated GPU-executed program 2A is generated based at least on program 2 and the summary data 40. The translated GPU-executed program may be configured to be executed in a GPU ABI 24B of the GPU 18B, as shown in FIG. 3. The host processor 16B may generate the translated GPU-executed program as described above with reference to FIG. 3. In embodiments in which the host processor 16B is configured to determine instruction data 50 indicating one or more instructions included in at least one other GPU-executed program, the translated GPU-executed program may be generated based at least in part on the instruction data 50. In such embodiments, the instruction data 50 determined for the at least one other GPU-executed program may also be used to generate the translated GPU-executed program. Also, in embodiments in which the host processor 16B is configured to determine instruction data 50 indicating one or more instructions included in at least one other GPU-executed program, generating the translated GPU-executed program may include adding to the GPU-executed program one or more instructions included in the at least one other GPU-executed program. The one or more instructions from the at least one other GPU-executed program may be added, for example, when an instruction at the end of a first program is moved to the beginning of a second program when the run-time executable cross-compiler 28 generates the translated GPU-executed program. Additionally or alternatively, generating the translated GPU-executed program may include removing one or more instructions from the GPU-executed program. For example, one or more instructions may be removed when an instruction is determined by the run-time executable cross-compiler 28 to have no effect when executed in the ABI 24B of the GPU 18B.

Figure 5:
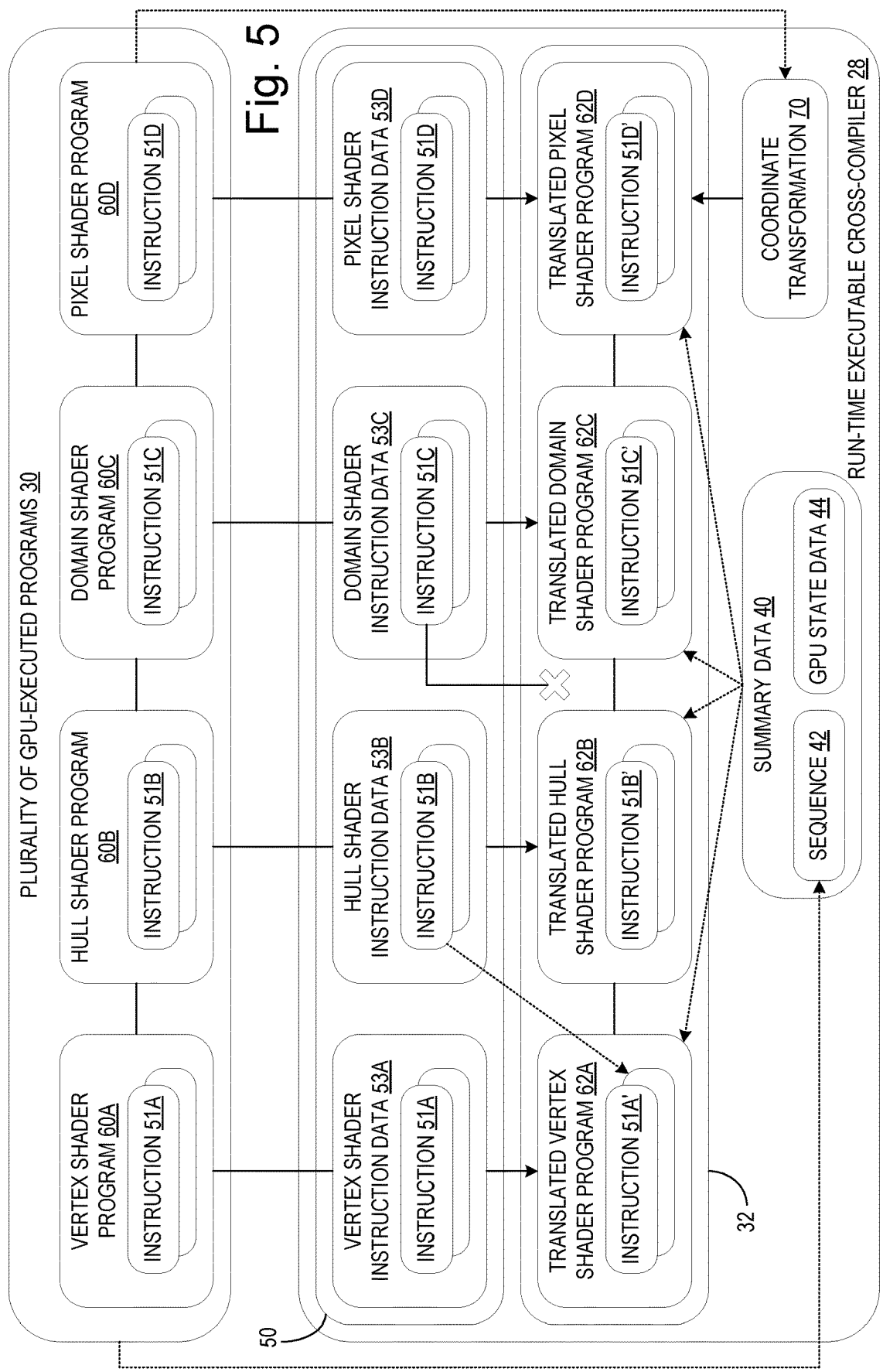
FIG. 5 shows an example run-time executable cross-compiler configured to translate a plurality of GPU-executed shader programs, according to the embodiment of FIG. 1.

In some embodiments of the present disclosure, each GPU-executed program of the plurality of GPU-executed programs 30 may be a shader program. The plurality of GPU-executed programs may include at least one pixel shader program. Additionally or alternatively, the plurality of GPU-executed programs 30 may include at least one vertex shader program, hull shader program, domain shader program, geometry shader program, or some other type of shader program. An embodiment in which each GPU-executed program of the plurality of GPU-executed programs 30 is a shader program is depicted in FIG. 5. In the embodiment of FIG. 5, the plurality of GPU-executed programs 30 includes a vertex shader program 60A, a hull shader program 60B, a domain shader program 60C, and a pixel shader program 60D. Each of the vertex shader program 60A, the hull shader program 60B, the domain shader program 60C, and the pixel shader program 60D shown in FIG. 5 includes a plurality of instructions 51A, 51B, 51C, and 51D respectively. The instructions 51A, 51B, 51C, and 51D may be encoded in the first ABI 24A.

The run-time executable cross-compiler 28 shown in FIG. 5 is configured to receive summary data 40 including the sequence 42 in which the plurality of GPU-executed programs 30 are configured to be executed. The summary data 40 further includes GPU state data 44 indicating one or more global properties 46 of the GPU 18B. The run-time executable cross-compiler 28 shown in FIG. 5 is further configured to receive instruction data 50 indicating the instructions included in each GPU-executed program of the plurality of GPU-executed programs 30. The instruction data includes vertex shader instruction data 53A, as well as hull shader instruction data 53B, domain shader instruction data 53C, and pixel shader instruction data 53D for shader programs 60A, 60B, 60C, and 60D respectively.

The run-time executable cross-compiler 28 then generates a translated GPU-executed program for each GPU-executed program, based on at least the summary data 40, the GPU-executed programs, and the instruction data 50. The plurality of translated GPU-executed programs 32 generated in the embodiment of FIG. 5 include a translated vertex shader program 62A, a translated hull shader program 62B, a translated domain shader program 62C, and a translated pixel shader program 62D. Each translated GPU-executed program is configured to be executed in the GPU ABI 24B, and includes one or more instructions. The translated vertex shader programs 62A, 62B, 62C, and 62D include one or more instructions 51A', 51B', 51C', and 51D' respectively. In the embodiment shown in FIG. 5, generating the translated vertex shader program 62 includes adding an instruction 51B included in the hull shader program 60B to the vertex shader program 60A. In addition, generating the translated domain shader program 62C includes removing an instruction 51C from the domain shader program 60C.

For each GPU-executed program of the plurality of GPU-executed programs 30, generating the translated GPU-executed program may include applying a coordinate transformation 70 to at least one output of the GPU-executed program. For example, the run-time executable cross-compiler 28 may change a display aspect ratio used by the GPU-executed program when generating the translated GPU-executed program. In the embodiment of FIG. 5, a coordinate transformation 70 is applied to the pixel shader program 60D when the run-time executable cross-compiler 28 generates the translated pixel shader program 62D.

Figure 6:
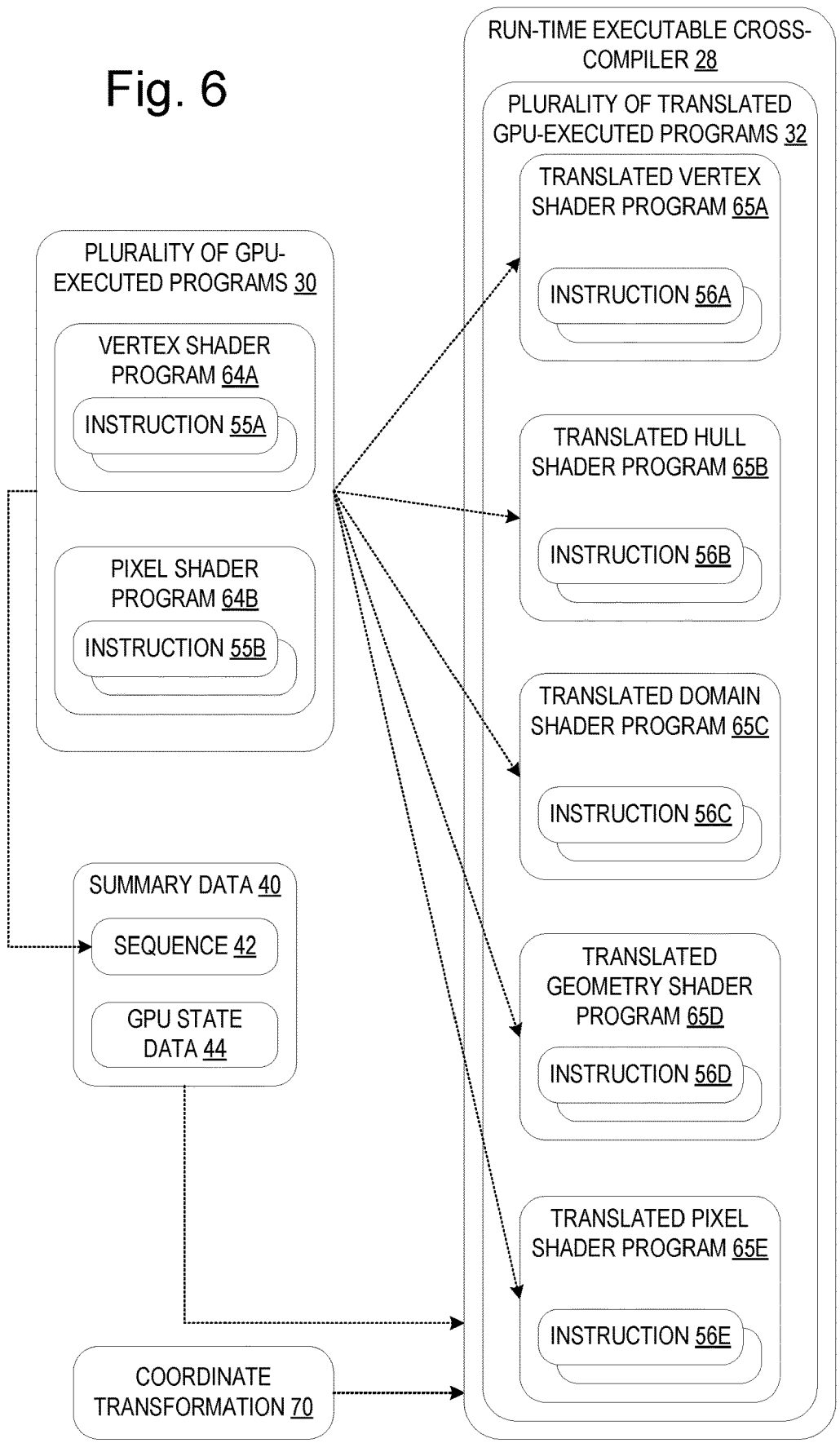
FIG. 6 shows an example run-time executable cross-compiler configured to translate a plurality of GPU-executed tessellation shader programs, according to the embodiment of FIG. 1.

In some embodiments of the present disclosure, the host processor 16B may be further configured to generate a plurality of translated GPU-executed programs 32 based at least in part on the GPU-executed program and the summary data 40. The plurality of translated GPU-executed programs 32 may also be generated based at least in part on the instruction data 50. In such embodiments, the GPU-executed programs may be tessellation shader programs, and the host processor 16B may be configured to generate a plurality of translated tessellation shader programs based at least in part on two or more GPU-executed programs of the plurality of GPU-executed programs 30. The plurality of translated tessellation shader programs may include one or more vertex shaders, hull shaders, domain shaders, geometry shaders, and/or pixel shaders. FIG. 6 shows an example embodiment in which a vertex shader program 64A and a pixel shader program 64B are translated by the run-time executable cross-compiler 28 to generate a translated vertex shader program 65A, a translated hull shader program 65B, a translated domain shader program 65C, a translated geometry shader program 65D, and a translated pixel shader program 65E. In the embodiment of FIG. 6, the vertex shader program 64A includes one or more instructions 55A, and the pixel shader program 64B includes one or more instructions 55B. Each of the translated GPU-executed programs 65A, 65B, 65C, 65D, and 65E may include one or more of the instructions 55A and 55B from the vertex shader and pixel shader programs 64A and 64B respectively, translated to be executed in the ABI 24B of the GPU 18B. In addition, a coordinate transformation 70 may be applied to outputs of one or both of the vertex shader and pixel shader programs 64A and 64B in generating the translated GPU-executed programs 65A, 65B, 65C, 65D, and 65E.

Figure 7:
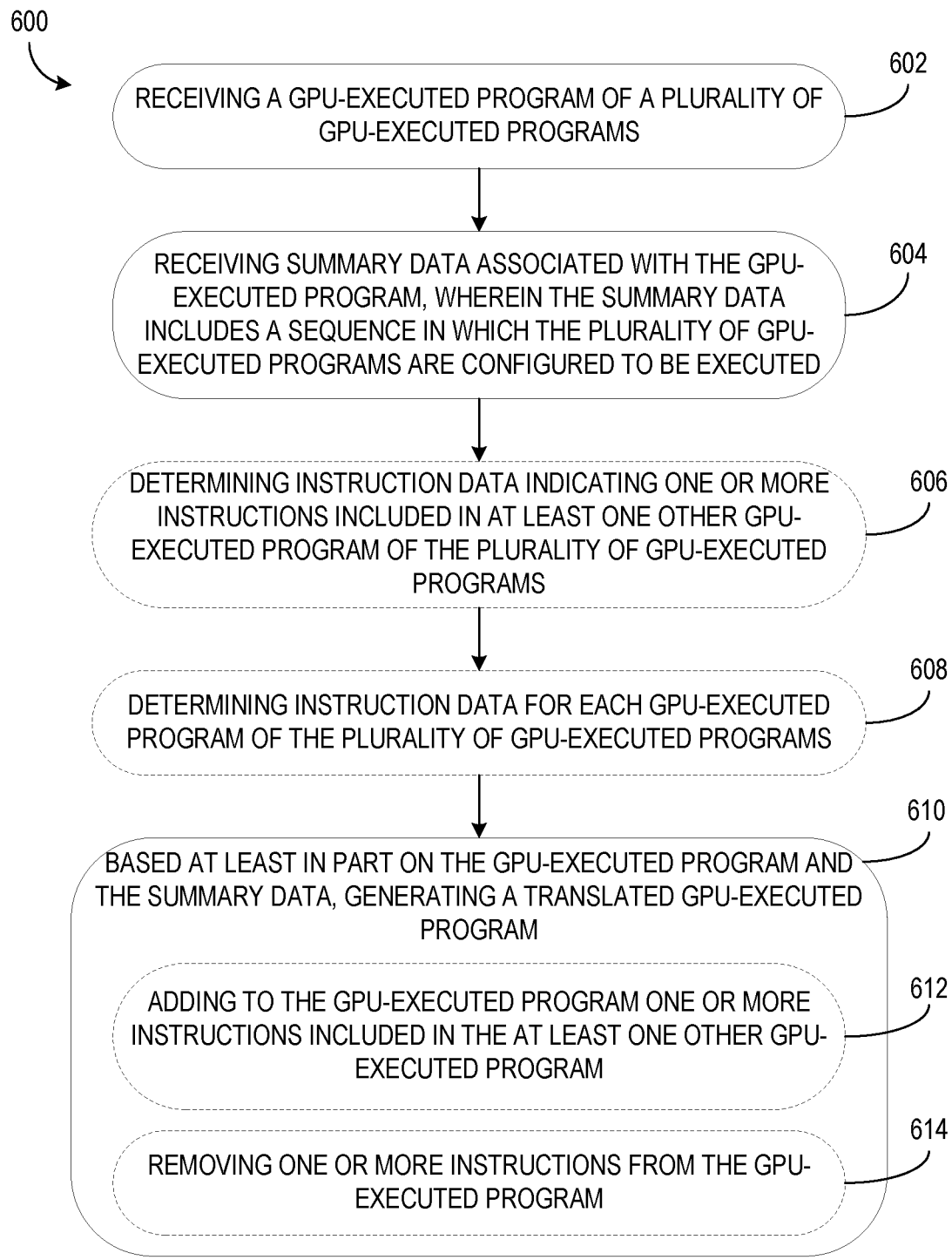
FIG. 7 shows a flowchart of a method for executing a runtime-executable cross-compiler on a processor of a computing system, according to one embodiment of the present disclosure.

FIG. 7 shows a flowchart of a method 600 that may be used for executing a runtime-executable cross-compiler on a processor of a computing system. The computing system may be the computing system 14 of FIG. 1. At step 602, the method includes receiving a GPU-executed program of a plurality of GPU-executed programs. The GPU-executed program may be received from an application program executed by the processor. In some embodiments, each GPU-executed program of the plurality of GPU-executed programs may be a shader program. In such embodiments, each of the shader programs may be a vertex shader, pixel shader, or tessellation shader program.

At step 604, the method 600 may further include receiving summary data associated with the GPU-executed program, wherein the summary data includes a sequence in which the plurality of GPU-executed programs are configured to be executed. In some embodiments, the summary data may further include GPU state data that indicates one or more global properties of the GPU. The one or more global properties of the GPU may include an ISA of the GPU.

Some implementations may optionally include step 606, at which the method 600 may include determining instruction data indicating one or more instructions included in at least one other GPU-executed program of the plurality of GPU-executed programs. In such implementations, the method 600 may further include, at step 608, determining instruction data for each GPU-executed program of the plurality of GPU-executed programs.

At step 610, the method 600 further includes, based at least in part on the GPU-executed program and the summary data, generating a translated GPU-executed program. In implementations in which the method 600 includes determining instruction data indicating one or more instructions included in at least one other GPU-executed program of the plurality of GPU-executed programs, the translated GPU-executed program may be generated based at least in part on the instruction data. In such implementations, step 610 may further include, at step 612, adding to the GPU-executed program one or more instructions included in the at least one other GPU-executed program. Step 610 may additionally or alternatively include, at step 612, removing one or more instructions from the GPU-executed program.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
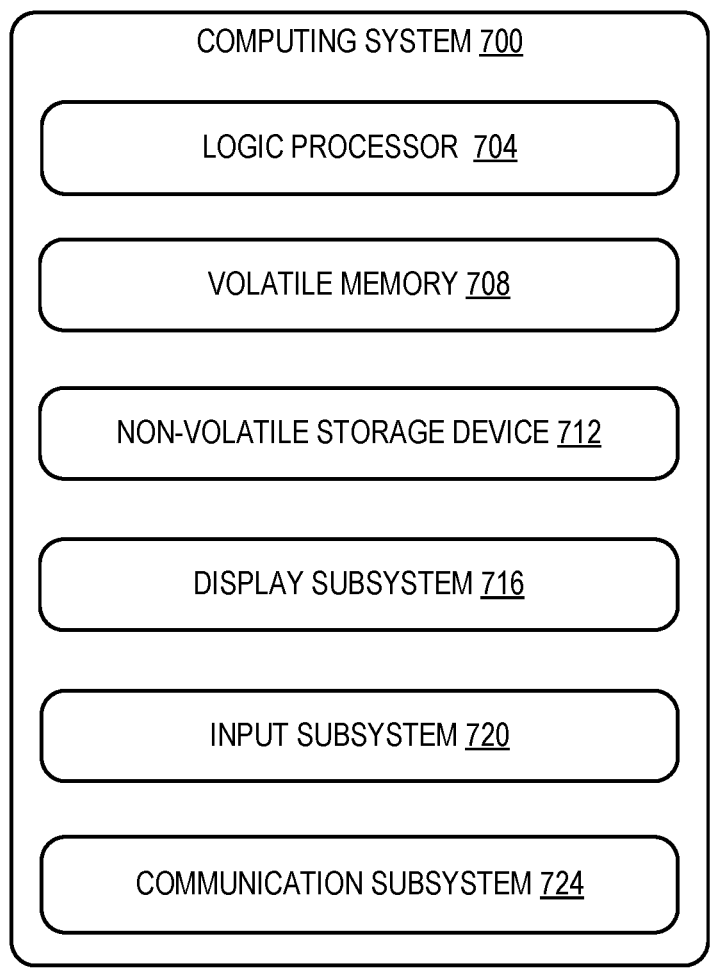
FIG. 8 shows a schematic representation of an example computing system, according to one embodiment of the present disclosure.

FIG. 8 schematically shows a non-limiting embodiment of a computing system 700 that can enact one or more of the methods and processes described above. Computing system 700 is shown in simplified form. Computing system 700 may embody the computing device of FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 704, volatile memory 708, and a non-volatile storage device 712. Computing system 700 may optionally include a display subsystem 716, input subsystem 720, communication subsystem 724, and/or other components not shown in FIG. 8.

Logic processor 704 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 704 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 708 may include physical devices that include random access memory. Volatile memory 708 is typically utilized by logic processor 704 to temporarily store information during processing of software instructions. It will be appreciated that volatile memory 708 typically does not continue to store instructions when power is cut to the volatile memory 708.

Non-volatile storage device 712 includes one or more physical devices configured to hold instructions executable by the logic processors to implement the methods and processes described herein. When such methods and processes are implemented, the state of non-volatile storage device 712 may be transformed—e.g., to hold different data.

Non-volatile storage device 712 may include physical devices that are removable and/or built-in. Non-volatile storage device 712 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 712 may include nonvolatile, dynamic, static, read/write, read-only, sequential-access, location-addressable, file-addressable, and/or content-addressable devices. It will be appreciated that non-volatile storage device 712 is configured to hold instructions even when power is cut to the non-volatile storage device 712.

Aspects of logic processor 704, volatile memory 708, and non-volatile storage device 712 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic processor 704 executing instructions held by non-volatile storage device 712, using portions of volatile memory 708. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 716 may be used to present a visual representation of data held by non-volatile storage device 712. As the herein described methods and processes change the data held by the non-volatile storage device, and thus transform the state of the non-volatile storage device, the state of display subsystem 716 may likewise be transformed to visually represent changes in the underlying data. Display subsystem 716 may include one or more display devices utilizing virtually any type of technology. Such display devices may be combined with logic processor 704, volatile memory 708, and/or non-volatile storage device 712 in a shared enclosure, or such display devices may be peripheral display devices.

When included, input subsystem 720 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 724 may be configured to communicatively couple computing system 700 with one or more other computing devices. Communication subsystem 724 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

According to one aspect of the present disclosure, a computing system is provided, comprising a graphical processing unit (GPU) and a processor configured to execute a run-time executable cross-compiler. The processor may be configured to receive a GPU-executed program of a plurality of GPU-executed programs. The processor may be further configured to receive summary data associated with the GPU-executed program. The summary data may include a sequence in which the plurality of GPU-executed programs are configured to be executed. The processor may be further configured to, based at least in part on the GPU-executed program and the summary data, generate a translated GPU-executed program.

According to this aspect, the cross-compiled program may be configured to be executed in a GPU application binary interface (ABI) of the GPU.

According to this aspect, the processor may be further configured to determine instruction data indicating one or more instructions included in at least one other GPU-executed program of the plurality of GPU-executed programs. The cross-compiled program may be generated based at least in part on the instruction data. According to this aspect, the processor may be further configured to determine instruction data for each GPU-executed program of the plurality of GPU-executed programs. According to this aspect, generating the cross-compiled program may include adding to the GPU-executed program one or more instructions included in the at least one other GPU-executed program. According to this aspect, generating the translated GPU-executed program may include removing one or more instructions from the GPU-executed program.

According to this aspect, each GPU-executed program of the plurality of GPU-executed programs may be a shader program. According to this aspect, the plurality of GPU-executed programs may include at least one vertex shader program. According to this aspect, the plurality of GPU-executed programs may include at least one pixel shader program. According to this aspect, the processor may be further configured to generate a plurality of translated GPU-executed programs based at least in part on the GPU-executed program and the summary data. According to this aspect, the processor may be configured to generate a plurality of translated tessellation shader programs based at least in part on two or more GPU-executed programs of the plurality of GPU-executed programs. According to this aspect, generating the translated GPU-executed program may include applying a coordinate transformation to at least one output of the GPU-executed program.

According to this aspect, the summary data may further include GPU state data that indicates one or more global properties of the GPU. According to this aspect, the one or more global properties of the GPU may include an instruction set architecture (ISA) of the GPU.

According to another aspect of the present disclosure, a method for executing a runtime-executable cross-compiler on a processor of a computing system is provided. The method may comprise receiving a GPU-executed program of a plurality of GPU-executed programs. The method may further comprise receiving summary data associated with the GPU-executed program. The summary data may include a sequence in which the plurality of GPU-executed programs are configured to be executed. The method may further comprise, based at least in part on the GPU-executed program and the summary data, generating a translated GPU-executed program.

According to this aspect, the method may further comprise determining instruction data indicating one or more instructions included in at least one other GPU-executed program of the plurality of GPU-executed programs. The translated GPU-executed program may be generated based at least in part on the instruction data. According to this aspect, the method may further comprise determining instruction data for each GPU-executed program of the plurality of GPU-executed programs. According to this aspect, generating the translated GPU-executed program may include adding to the GPU-executed program one or more instructions included in the at least one other GPU-executed program and/or removing one or more instructions from the GPU-executed program.

According to this aspect, each GPU-executed program of the plurality of GPU-executed programs may be a shader program.

According to another aspect of the present disclosure, a computing system is provided, comprising a graphical processing unit (GPU) and a processor configured to execute a run-time executable cross-compiler. The processor may be configured to receive a GPU-executed program of a plurality of GPU-executed programs. Each GPU-executed program of the plurality of GPU-executed programs may be a shader program. The processor may be further configured to receive summary data associated with the GPU-executed program. The summary data may include a sequence in which the plurality of GPU-executed programs are configured to be executed. The processor may be further configured to determine instruction data indicating instructions included in at least one other GPU-executed program of the plurality of GPU-executed programs. The processor may be further configured to, based at least in part on the GPU-executed program, the summary data, and the instruction data, generate a translated GPU-executed program.

When a graphical processing unit (GPU) processes image data to be displayed, textures may be applied to the image data. Texture data indicating that the GPU is to apply a texture to the image data may be formatted in a variety of ways. The formatting of texture data may differ between GPUs.

Figure 9:
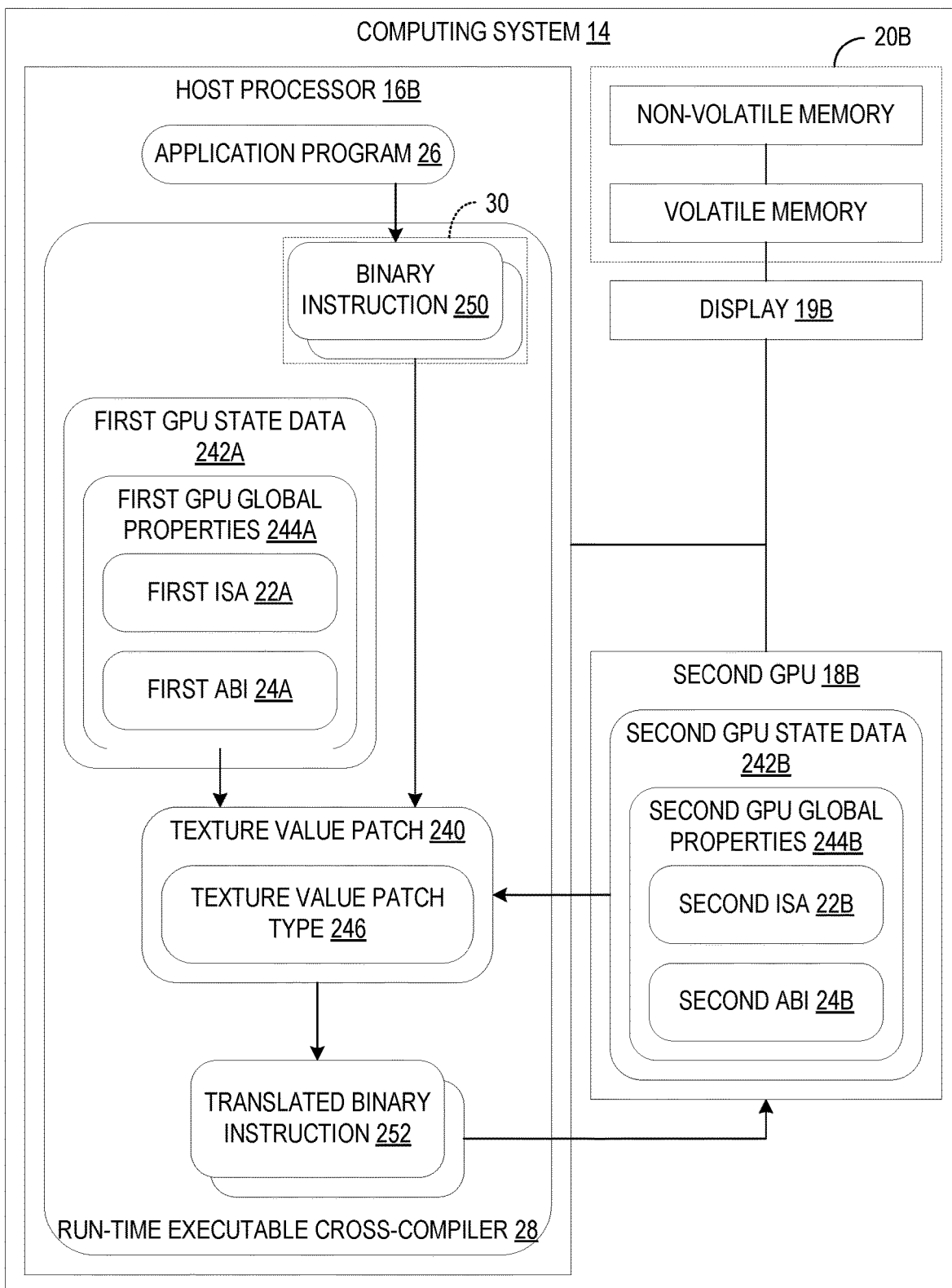
FIG. 9 shows an example embodiment of a computing system configured to execute instructions for a first GPU on a second GPU, according to the embodiment of FIG. 1.

Texture value patching is described below with reference to FIGS. 9-15. FIG. 9 shows an example embodiment of a computing system, which may be the second computing device 14 of FIG. 1. The computing system 14 shown in FIG. 9 is configured to execute instructions for a first GPU, which may be the first GPU 18A shown in FIG. 1, on a second GPU 18B. The computing system 14 comprises the second GPU 18B, a host processor 16B, a display 19B, and other computing parts 20B including volatile memory and non-volatile memory.

The host processor 16B is configured to receive second GPU state data 242B that indicates one or more global properties 244B of the second GPU 18B. The one or more global properties 244B of the second GPU 18B may include a second ISA 22B of the second GPU 18B, and/or a second ABI 24B of the second GPU 18B. The global properties 244B of the second GPU 18B may additionally or alternatively include other properties, and the second GPU state data 242B may further include other data associated with the second GPU 18B. In some embodiments, the host processor 16B may be further configured to receive first GPU state data 242A that indicates one or more global properties 244A of the first GPU 18A. The one or more global properties 244A of the first GPU 18A may include a first ISA 22A of the first GPU 18A and/or a first ABI 24A of the first GPU 18A. The global properties 244A of the first GPU 18A may additionally or alternatively include other properties, and the first GPU state data 242A may further include other data associated with the first GPU 18A.

Figure 10:
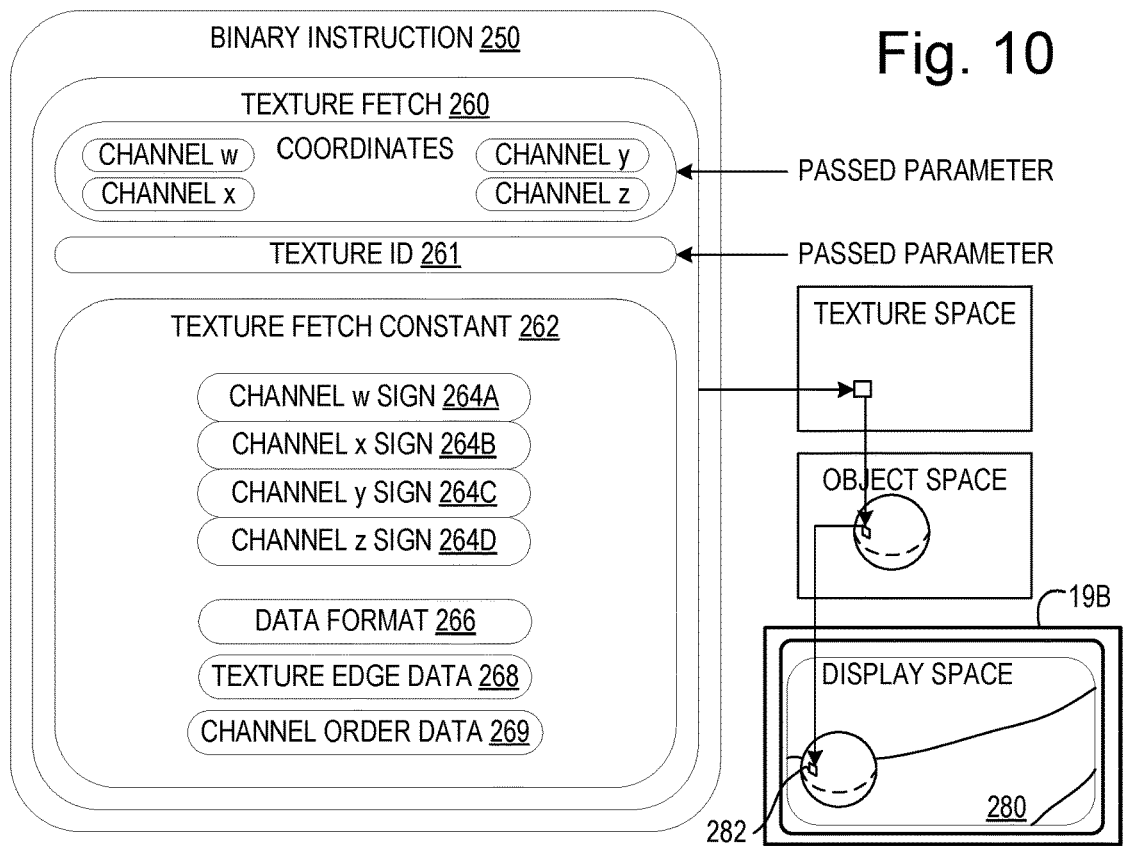
FIG. 10 shows a binary instruction including a texture fetch, according to the embodiment of FIG. 1.

The host processor 16B is further configured to receive one or more binary instructions 250 for texture operations configured for (i.e., in a format that is configured to be executed on) the first GPU 18A. The one or more binary instructions 250 may be included in one of the plurality of programs 30 that are utilized by application program 26, for example. The one or more binary instructions 250 may be received from an application program 26, and may be encoded in the first ABI 24A of the first GPU 18A. The one or more binary instructions 250 for texture operations may include one or more texture fetches. For example, FIG. 10 depicts a binary instruction 250 including a texture fetch 260. Each texture fetch 260 of the one or more texture fetches 260 included in the one or more binary instructions

250 may indicate a texture to be displayed on the display 19B of the computing system 14. When the texture encoded in the texture fetch 260 is displayed on the display 19B, the texture may be applied to an image 280. The image 280 may be a triangle or other polygon, particularly in computer graphics applications that utilize mesh representations of virtual objects that are repeatedly repositioned and rendered in real time in response to user inputs and program logic that affects the movement of such virtual objects within a three-dimensional virtual environment.

With regards to the particulars of the texture fetches 260, each texture fetch 260 of the one or more texture fetches 260 may be called by an instruction that includes accompanying parameters including a texture ID 261 that identifies the texture upon which the fetch is to be performed, and coordinates that identify a location within the texture for which the fetch operation will return the stored value. The stored value may be a color value, transparency value, or other type of value represented in the texture. The coordinates may be in two dimensions for a two-dimensional texture array, and in three-dimensions for a three-dimensional texture array, and in the depicted example are represented as three dimensional coordinates encoded in channels w, x, y, z, including an omega value used for computation purposes. A two-channel representation may alternatively be used for a two-dimensional texture array. The texture fetch 260 may also include a texture fetch constant 262. The texture fetch constant 262 may include data that affects how the fetched texture value is displayed. For example, the texture fetch constant 262 may include channel attributes such as signs for the one or more channels indicating the manner in which a texture value is to be read. In the embodiment of FIG. 10, the texture fetch constant 262 includes four channels: channel w, channel x, channel y, and channel z. The channels indicate coordinates of the texture, which typically are coordinates in texture map space. Alternatively, the coordinates may be coordinates in display space or object space, for example, and the binary instruction 250 may include instructions to convert from the display space or object space to the texture map space, in order to retrieve the appropriate texture value for the coordinates in display space or object space. The texture fetch constant 262 may further include one or more of a data format 266, texture edge data 268, and channel order data 269. The data format 266 may indicate the format in which the binary instruction 250 is encoded, for example, when the first ISA 22A and first ABI 24A allow binary instructions 250 to be encoded in a plurality of different data formats 266. The texture edge data 268 may indicate behavior of the texture at or near an edge of the image 280. For example, the texture edge data 268 may indicate that the texture increases in transparency near the edge of the image 280. The channel order data 269 may indicate an order in which the channels used to output the results of the texture fetch, and may indicate, for example, a change in channel order from a default channel order.

Returning to FIG. 9, the host processor 16B is further configured to, based on the second GPU state data 242B, apply a texture value patch 240 to the one or more binary instructions 250. In embodiments in which the host processor 16B receives first GPU state data 242A indicating one or more global properties 244A of the first GPU 18A, the host processor 16B may also apply the texture value patch 240 based at least in part on the one or more global properties 244A of the first GPU 18A. Applying the texture value patch 240 may translate the one or more binary instructions 250 into one or more translated binary instructions 252 configured to be executed on the second GPU 18B. The host processor 16B may be translated from the first ABI 24A to the second ABI 24B as discussed above with reference to FIGS. 2 and 3.

Figure 11:
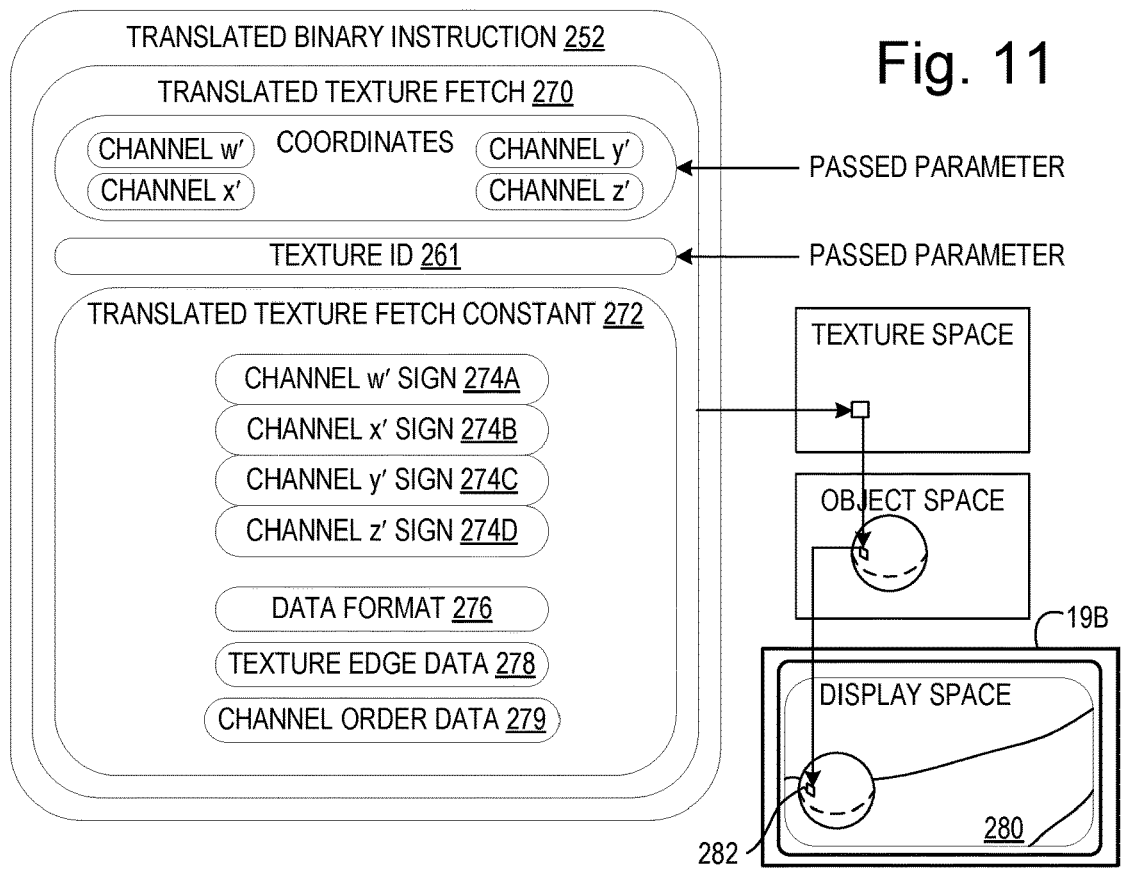
FIG. 11 shows a translated binary instruction including a translated texture fetch, according to the embodiment of FIG. 1.

In implementations in which the binary instructions 250 include a texture fetch 260, the translated binary instructions 252 may include a translated texture fetch 270, as shown in FIG. 11. The translated texture fetch 270 may include channels w', x', y', and z', which correspond generally to channels w, x, y, and z, but which may also differ in some respects, such as mathematical sign, bias, or offsets for these values, for example. For this reason, the translated texture fetch constant 272 may include signs 274A-274D for channels w', x', y', and z', and may further include a data format 276, texture edge data 278, and channel order data 279 that are appropriate for execution on the second GPU 18B.

With reference to FIG. 10, each channel included in the texture fetch constant 262 of a texture fetch 260 may have one or more associated channel attributes. The channel attributes may indicate a mathematical sign for the channel (e.g., positive or negative), as well as a parameter indicating whether and what type of gamma encoding is used and a parameter indicating whether and what type of bias encoding is used. In the example of FIG. 10, a channel w sign 264A, a channel x sign 264B, a channel y sign 264C, and a channel z sign 264D are associated with channel w, channel x, channel y, and channel z respectively. With reference to FIG. 11, the translated texture fetch 270 may include a channel w' sign 274A, a channel x' sign 274B, a channel y' sign 274C, and a channel z' sign 274D associated with channel w', channel x', channel y', and channel z' respectively. The sign associated with a channel may include data that determines how the channel is interpreted when the channel is read by the second GPU 18B. In some embodiments, the texture value patch 240 may be applied to the one or more binary instructions 250 during the translation of the binary instructions 250 to translated binary instructions 252 based at least in part on the signs of the one or more channels. The texture value patch 240 may have a texture value patch type 246 determined at least in part by one or more signs of the one or more channels, the texture value patch type 246 being selected from the group consisting of incompatible signs, gamma, depth, and bias. In one implementation, the texture value patch 240 may be an incompatible signs texture value patch configured to translate a texture fetch 260 into a plurality of translated texture fetches 270. For example, when the first ISA 22A supports arbitrary assignment of numeric interpretation to each channel of a texture fetch 260, but the second ISA 22B does not, applying an incompatible signs texture value patch to the texture fetch 260 may allow for the use of a different numeric representation for each channel.

Figure 12:
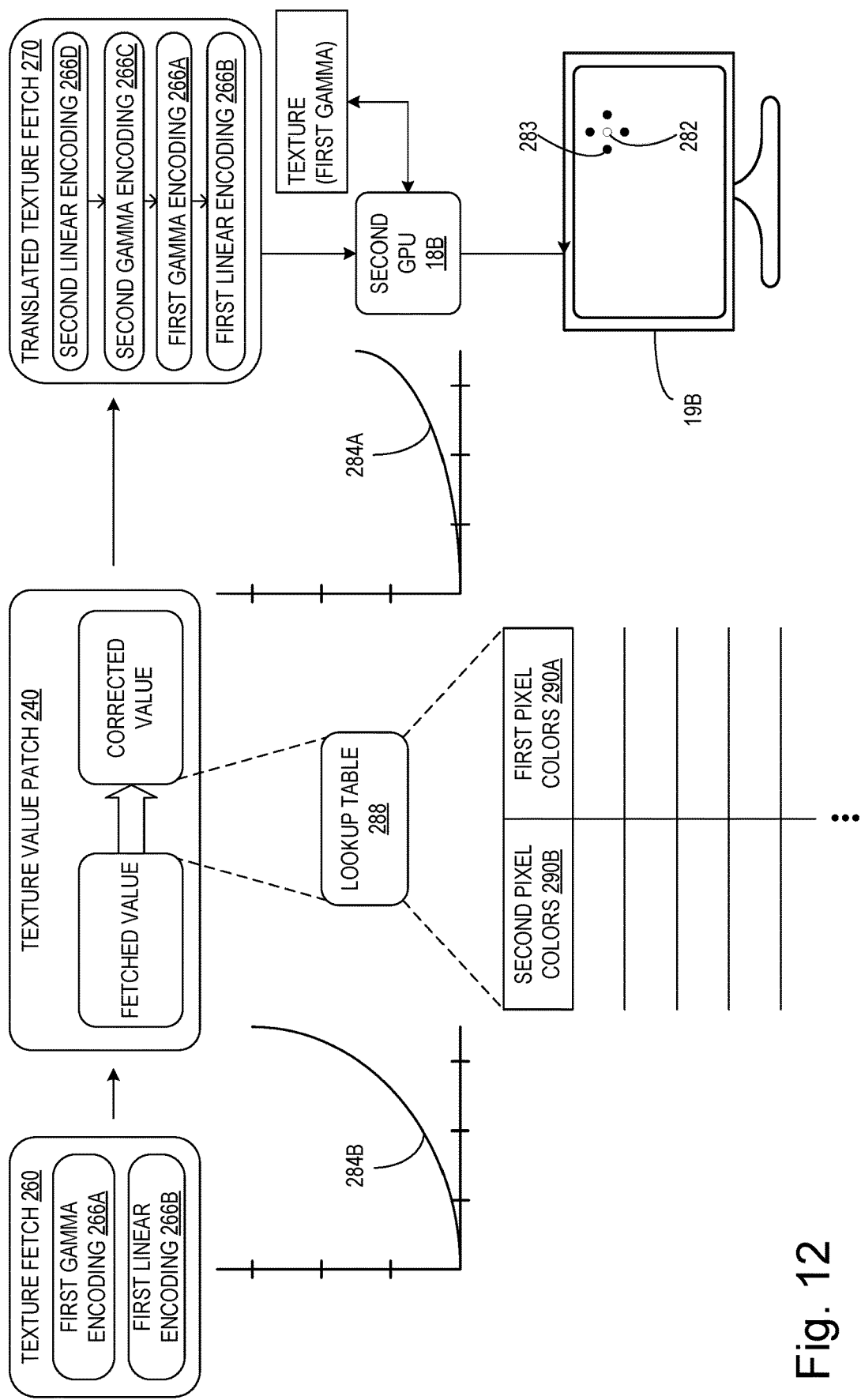
FIG. 12 shows an example implementation of a texture patch that translates gamma encoding, according to the embodiment of FIG. 1.

Gamma correction may be encoded differently in the first ABI 24A compared to the second ABI 24B. For example, as illustrated in FIG. 12, the data format 266 of the texture fetch constant 262 may be in a second gamma encoding 266C of the second ABI 24, that is different from a first gamma encoding 266A of the first ABI. Each channel of the texture fetch constant 262 may have a gamma sign. The host processor 16B may be configured to utilize a texture value patch 240 to convert the texture fetch 260 so that it is able to properly process texture values that are stored in the first gamma encoding 266A on the second GPU 18B, even when those first gamma encoded values are processed (e.g., de-gamma processing) in hardware by the second GPU 18B using algorithms that are designed for the second gamma encoding 266C. The texture fetch constant 262 illustrated in FIG. 10 may include data indicating channel attributes such as the sign of each channel indicating the coordinates of for the texture fetch. These coordinates are typically in texture space, as shown, but may also be in display or object space and converted back to texture space. A texture fetch may be passed coordinates in texture space that map to a position 282 in display space that is located between a plurality of pixels 283 (see FIG. 12). In this case, translated texture fetch 270 executed by the second GPU 18B may blend color values of the pixels 283 to generate a blended color value. As discussed in detail below, the blending may be performed by the translated texture fetch 270 in linear space or near linear space as approximated by the techniques described below, after the texture value has been converted during pre-processing (see 285 in FIG. 13) from the second gamma encoding 266C to the first gamma encoding 266A, and again from the first gamma encoding 266A to the first linear encoding 266B. This is linear space from the point of view of the second GPU 18B, which has converted the texture value using algorithms originally designed for second gamma encoding 266C, but merely an approximation of linear space for the texture values that are encoded in first gamma encoding 266A. By approximating linear space in this manner for the first gamma encoded texture, the approach disclosed herein reduces the amount of error when filtering a texture value encoded in the first gamma encoding 266A (as opposed to filtering before any decoding) but introduces slight mathematical errors. This strikes a balance between performance and accuracy, since the hardware blending capabilities of the second GPU 18B may be utilized while avoiding most of the error. The present approach can be contrasted with a faster but less accurate approach wherein the second GPU 18B filters a texture value in the first gamma space and then converts the filtered texture value from first gamma encoding 226A to the first linear encoding 266B. The present approach may also be contrasted with an approach that is slower but more accurate, in which all values necessary for blending are fetched, the conversion of first gamma encoding 266A to the first linear encoding 266B is performed for all pixels, and the filtering is applied without GPU hardware support.

As discussed in more detail below, after blending computations are performed, the host processor 16B may be further configured to apply post-processing (see 286 in FIG. 13) to the texture fetch 260. The post-processing may include converting the texture fetch 260 back to the second gamma encoding 266C after blending is performed.

To achieve this, the texture value patch 240 may be a gamma patch configured to convert fetched texture values that are gamma encoded according to a first gamma correction curve 284A of the first GPU 18A and processed in hardware by the second GPU 18B as if they were encoded according to the second gamma correction curve 284B to corrected texture values. The corrected texture values may be linearly or near-linearly encoded with a first linear encoding 266B at the first GPU 18A as part of the pre-processing 285 (see FIG. 13). In one specific implementation, the first gamma correction curve 284A may be a piecewise linear (PWL) sRGB gamma curve and the second gamma correction 284B curve may be a non-approximated sRGB gamma curve, for example. By converting values processed in-hardware by the second GPU 18B using algorithms designed for the second gamma correction curve 284B to values that are linear or near encoded in a first linear encoding 266B of the first GPU 18A, the second GPU 18B may execute code configured for execution on the first GPU 18A with first gamma encoding 266A, which has been cross-compiled in real time for execution on the second GPU 18B. In this way, the second GPU 18B may output a texture value that is appropriate to be displayed on the display 19B even though the translated binary instruction 252 is run on the second GPU 18B, since the translated binary instruction 252 compensates for the in-hardware gamma decoding of the second GPU 18B.

Since converting values in this manner may be computationally intensive, the host processor 16B may generate a lookup table 288 that indicates first pixel colors 290A pre-correction (these are the values output by the in-hardware de-gamma processing of the texture value by the second GPU 18B) and corresponding second pixel colors 290B post correction (these are values that have been corrected to linear or near linear space for the first GPU 18A). For processing efficiency, the look-up table approximates in one step three distinct conversions, described in detail below with reference to FIG. 13. The lookup table 288 may be generated prior to the application of the texture value patch 240, and may be stored in non-volatile memory accessible by the second GPU 18B. When the texture value patch 240 is applied to the texture fetch 260 to produce a translated texture fetch 270, instructions are inserted into the translated texture fetch 270 that cause values encoded according to the second gamma correction curve 84B to be converted to values encoded according to the first gamma correction curve 84A at least in part using the lookup table 288 during execution of the translated texture fetch 270.

Figure 13:
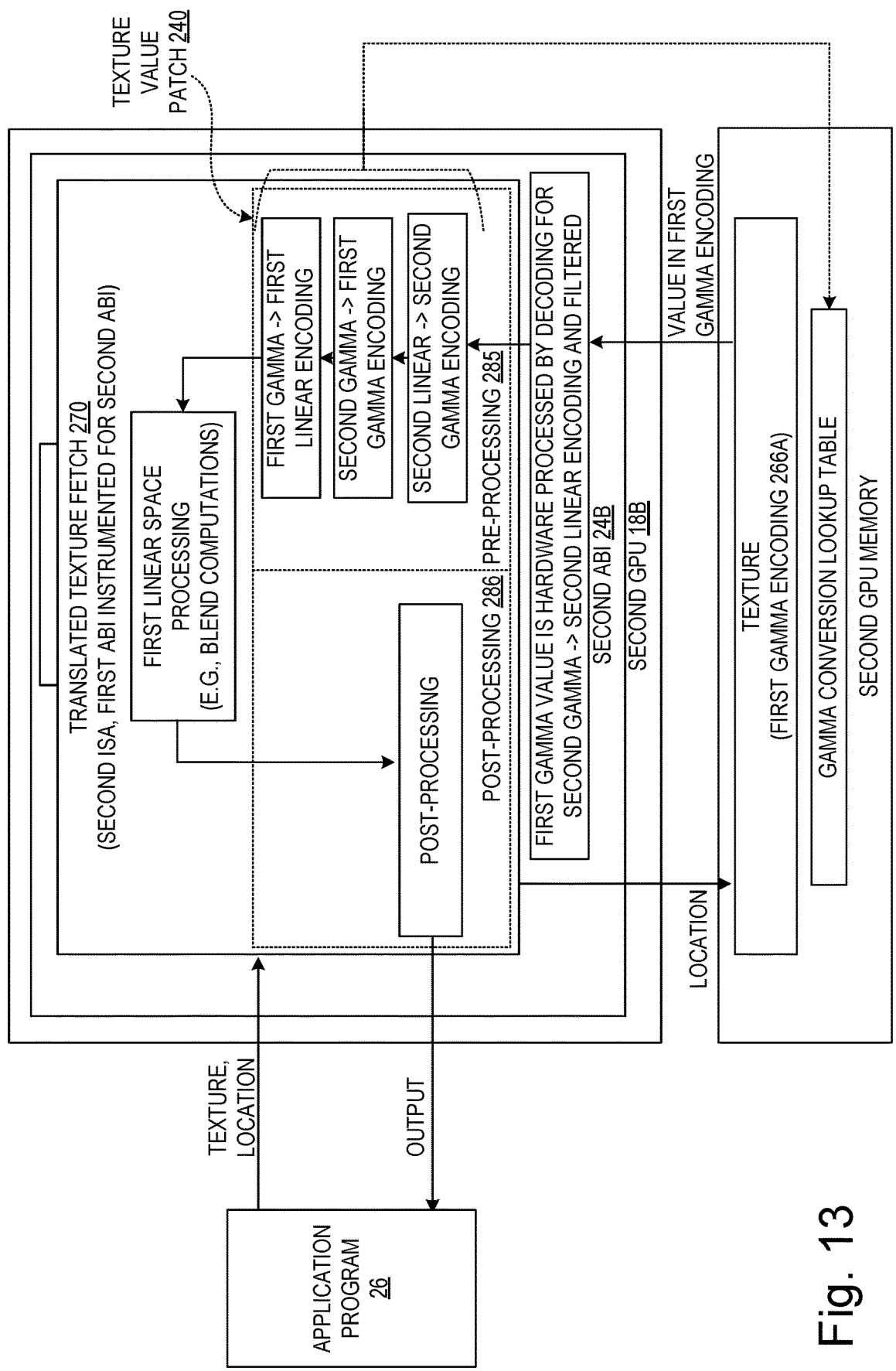
FIG. 13 shows a process flow that is implemented when the second GPU is configured to automatically perform in-hardware de-gamma conversion and filtering of texture values retrieved from second GPU memory, according to the embodiment of FIG. 1.

FIG. 13 shows a process flow that is implemented when the second GPU 18B is configured to automatically perform in-hardware de-gamma conversion and filtering of texture values retrieved from second GPU memory. As shown in FIG. 13, when executed, the translated texture fetch 270 converts one or more texture values read from the stored texture, which are encoded in first gamma encoding 266A. Automatically, the second GPU 18B runs de-gamma processing on the fetched texture values to convert them from gamma encoding to linear encoding, and then applies filtering to texture value after applying in-hardware de-gamma processing. Since these texture values are encoded in the first gamma encoding 266A, but processed in hardware by de-gamma and filtering algorithms that are designed to convert from the second gamma encoding 266C to second linear encoding 266D of the second GPU 18B, error is introduced to the value fetched. To compensate for this error, the texture value patch 240 is configured to perform three conversions on the fetched texture value. First, the value is converted from second linear encoding 266D to second gamma encoding 266C. Second, the value is converted from the second gamma encoding 266C to the first gamma encoding 266A. Third, the value is converted from the first gamma encoding 266A to the first linear encoding 266B. At this point the texture is a value in the near linear space of the first GPU 18A. That is, except for minor conversion errors, it is represented in the linear space in which the code of the translated texture fetch 270, which was originally configured for execution on the first GPU 18A, processes texture values.

In first linear encoding 266B space, the translated texture fetch 270 may perform various processing according to its own program logic (translated into the second ISA 22B), such as adding, multiplying, pixel blending, alpha blending, etc. It will be appreciated that performing mathematical operations on texture values in gamma space would be less accurate, and for this reason conversion to linear space prior to performing mathematical operations is used to minimize the amount of error introduced during the hardware filtering operation.

The result of the first linear encoding 266B space processing may converted appropriately during post-processing 286 for output to the application program 26. The texture value is then sent to the application program 26 and eventually rasterized for display on the display 19B. In this manner, computations on texture values can be made after de-gamma conversion to linear space by the second GPU 18B, and then converted to the appropriate encoding for output.

Figure 14:
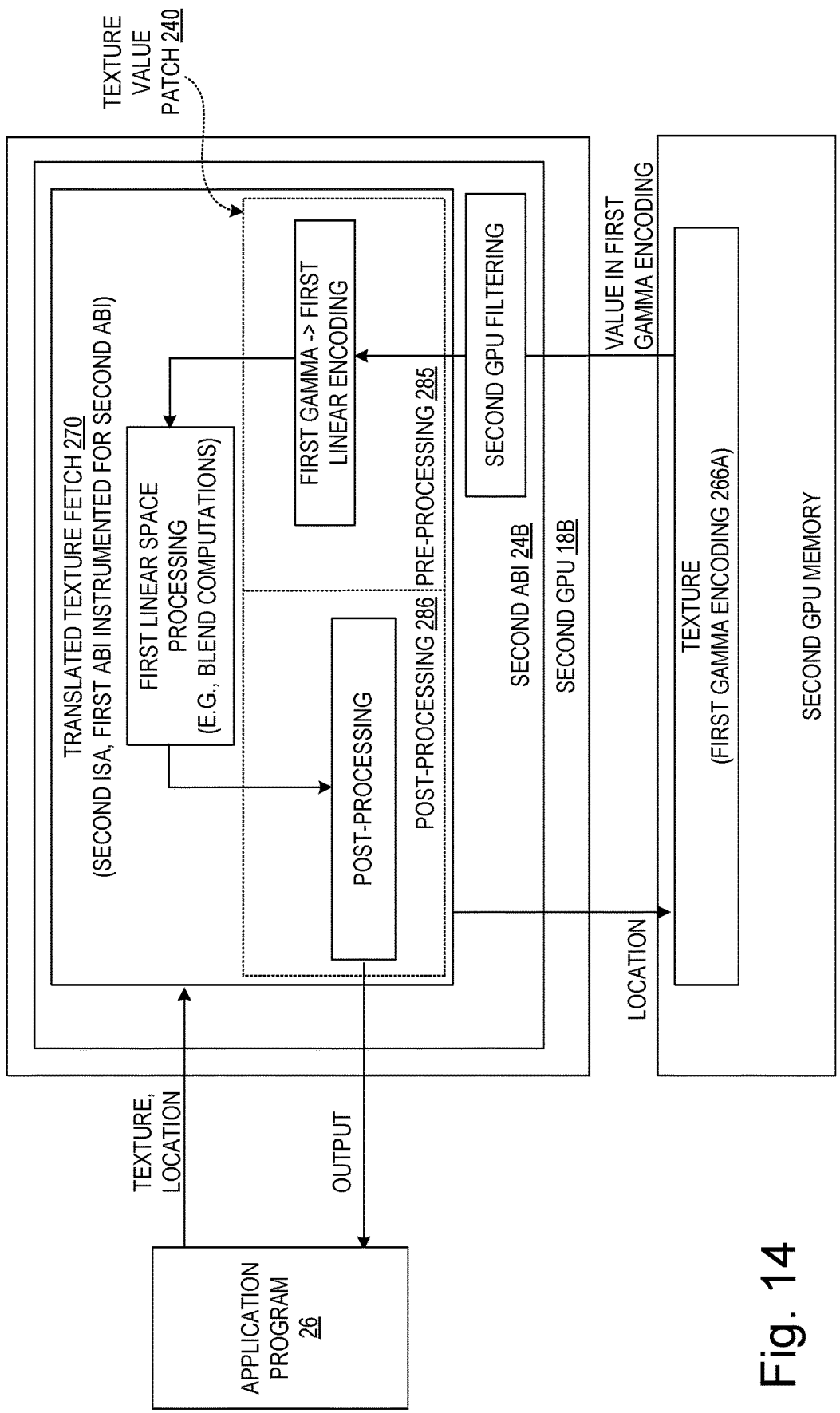
FIG. 14 shows a process flow that is implemented when the second GPU is not configured to automatically perform in-hardware de-gamma conversion and filtering of texture values retrieved from second GPU memory, according to the embodiment of FIG. 1.

FIG. 14 shows a process flow that is implemented when the second GPU 18B is not configured to automatically perform in-hardware de-gamma conversion and filtering of texture values retrieved from second GPU memory. The primary difference from the process flow of FIG. 13 is that after the texture value is retrieved from the second GPU memory, since no in-hardware de-gamma conversion is performed in the process flow of FIG. 14, the pre-processing 285 by the texture value patch includes conversion from a first gamma encoding 266A to a first linear encoding 266B, after which processing, such as blend computations, may occur in first linear encoding 266B space. Post-processing 286 proceeds as described above for FIG. 13.

Figure 15:
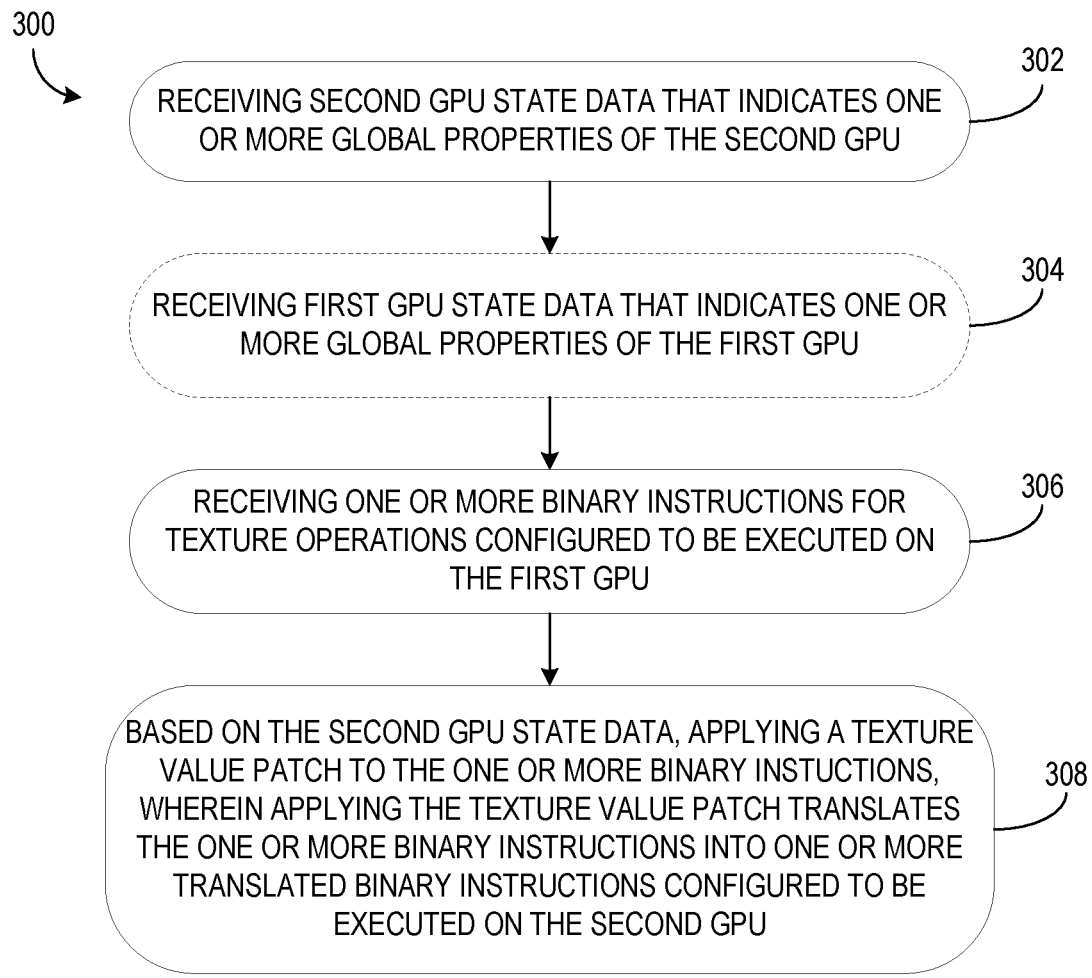
FIG. 15 shows a flowchart of an example method for executing instructions for a first GPU on a second GPU, according to the embodiment of FIG. 1.

FIG. 15 depicts a flowchart of an example method 300 for executing instructions for a first GPU on a second GPU. The method 300 may be performed on the second computing system 14 of FIG. 1, for example, or on other suitable hardware. At step 302, the method 300 includes receiving second GPU state data that indicates one or more global properties of the second GPU. The one or more global properties of the second GPU may include an ISA of the second GPU and/or an ABI of the second GPU. In some embodiments, the method 300 may further include, at step 304, receiving first GPU state data that indicates one or more global properties of the first GPU. It will be appreciated that the first GPU state data may include an ISA of the first GPU and/or an ABI of the first GPU, as discussed above.

At step 306, the method 300 further includes receiving one or more binary instructions for texture operations configured to be executed on the first GPU. In some embodiments, the one or more binary instructions for texture operations may include one or more texture fetches. In such embodiments, each texture fetch of the one or more texture fetches may indicate a texture to be displayed on a display of the computing system. Each texture fetch of the one or more texture fetches may be invoked by an instruction that passes a texture ID identifying a texture for the operation, and coordinates identifying a location in the texture, as well as a texture fetch constant. The texture fetch constant may include channel attributes (e.g., signs) for one or more channels indicating the manner in which a texture value is to be read. The fetched texture value is converted from texture space to object space for application to an object model, and in turn converted to display space for eventual display in an image on a display. The texture fetch constant may further include one or more of a data format, texture edge data, and channel order data, as described in greater detail above.

At step 308, the method 300 further includes, based on the second GPU state data, applying a texture value patch to the one or more binary instructions. The decision whether to apply a texture value patch in step 308 may be based on one or more factors, including the first GPU state and the second GPU capabilities as represented in the second GPU state data. The first GPU state may tell the system what operation was intended to be executed on the first GPU, when combined with the binary instructions, and the second GPU capabilities indicated in the second GPU state data, which are statically known, determine if the operation can be faithfully replicated on the second GPU without additional processing. If the operation cannot be faithfully replicated, then a texture value patch is added to the translated binary instructions. This same conditional logic governing the application of the texture value patch applies to the system in FIGS. 13 and 14.

Applying the texture value patch may translate the one or more binary instructions into one or more translated binary instructions configured to be executed on the second GPU. In implementations in which the one or more binary instructions include one or more texture fetches, the texture value patch may have a texture value patch type determined at least in part by one or more signs of the one or more channels included in the texture fetch constant of each texture fetch. The texture value patch type may be selected from the group consisting of incompatible signs, gamma, depth, and bias, as discussed in greater detail above. In one implementation, the texture value patch may be an incompatible signs texture value patch configured to translate a texture fetch into a plurality of translated texture fetches. In another implementation, the texture value patch may be a gamma patch configured to convert a second gamma correction curve of the second GPU to a first gamma correction curve of the first GPU. In such an implementation, the second gamma correction curve may be converted to the first gamma correction curve at least in part using a lookup table, as discussed in greater detail above.

According to one aspect of the present disclosure, a computing system configured to execute instructions for a first GPU on a second GPU is provided. The computing system may comprise the second GPU and a processor configured to receive second GPU state data that indicates one or more global properties of the second GPU. The processor may be further configured to receive one or more binary instructions for texture operations configured for the first GPU. The processor may be further configured to, based on the second GPU state data, apply a texture value patch to the one or more binary instructions. Applying the texture value patch may translate the one or more binary instructions into one or more translated binary instructions configured to be executed on the second GPU.

According to this aspect, the computing system may further comprise a display. The one or more binary instructions for texture operations may include one or more texture fetches, and each texture fetch of the one or more texture fetches may return a texture value to be displayed on the display.

According to this aspect, each texture fetch of the one or more texture fetches may be invoked by instructions that include as arguments a texture ID and coordinates for the texture fetch. The texture fetch may include a texture fetch constant. The texture fetch constant may include a sign for the one or more channels that encode coordinates for the texture fetch.

According to this aspect, the texture value patch may have a texture value patch type determined at least in part by one or more signs of the one or more channels. The texture value patch type may be selected from the group consisting of incompatible signs, gamma, depth, and bias.

According to this aspect, the texture value patch may be an incompatible signs texture value patch configured to translate a texture fetch into a plurality of translated texture fetches.

According to this aspect, the texture value patch may be a gamma patch configured to convert fetched texture values that are gamma encoded according to a first gamma correction curve of the first GPU and processed in hardware by the second GPU as if they were encoded according to the second gamma correction curve to corrected texture values that are linear or near linear encoded in a first linear encoding space of the first GPU.

According to this aspect, the gamma patch may convert the texture values at least in part using a lookup table.

According to this aspect, the texture fetch constant may further include one or more of a data format, texture edge data, and channel order data.

According to this aspect, the one or more global properties of the second GPU may include an ISA of the second GPU and/or an ABI of the second GPU.

According to this aspect, the processor may be further configured to receive first GPU state data that indicates one or more global properties of the first GPU including an ISA of the first GPU and/or an ABI of the first GPU. The texture value patch may be applied based at least in part on the one or more global properties of the first GPU.

According to another aspect of the present disclosure, a method for executing instructions for a first GPU on a second GPU is provided. The method may comprise receiving second GPU state data that indicates one or more global properties of the second GPU. The method may further comprise receiving one or more binary instructions for texture operations configured for the first GPU. The method may further comprise, based on the second GPU state data, applying a texture value patch to the one or more binary instructions. Applying the texture value patch may translate the one or more binary instructions into one or more translated binary instructions configured to be executed on the second GPU.

According to this aspect, the one or more binary instructions for texture operations may include one or more texture fetches. Each texture fetch of the one or more texture fetches may indicate a texture to be displayed on a display.

According to this aspect, each texture fetch of the one or more texture fetches may include a texture fetch constant. The texture fetch constant may include a sign for each of one or more channels that encode coordinates for the texture fetch.

According to this aspect, the texture value patch may have a texture value patch type determined at least in part by one or more signs of the one or more channels. The texture value patch type may be selected from the group consisting of incompatible signs, gamma, depth, and bias.

According to this aspect, the texture value patch may be an incompatible signs texture value patch configured to translate a texture fetch into a plurality of translated texture fetches.

According to this aspect, the texture value patch may be a gamma patch configured to convert fetched texture values that are gamma encoded according to a first gamma correction curve of the first GPU and processed in hardware by the second GPU as if they were encoded according to the second gamma correction curve to corrected texture values that are linear or near linear encoded in a first linear encoding space of the first GPU.

According to this aspect, the texture fetch constant may further include one or more of a data format, texture edge data, and channel order data.

According to this aspect, the one or more global properties of the second GPU may include an ISA of the second GPU and/or an ABI of the second GPU.

According to this aspect, the method may further comprise receiving first GPU state data that indicates one or more global properties of the first GPU including an ISA of the first GPU and/or an ABI of the first GPU. The texture value patch may be applied based at least in part on the one or more global properties of the first GPU.

According to another aspect of the present disclosure, a computing system configured to execute instructions for a first GPU on a second GPU is provided. The computing system may comprise the second GPU, a display, and a processor configured to receive first GPU state data that indicates one or more global properties of the first GPU. The processor may be further configured to receive second GPU state data that indicates one or more global properties of the second GPU. The processor may be further configured to receive one or more binary instructions for texture operations configured for the first GPU. The one or more binary instructions for texture operations may include one or more texture fetches. Each texture fetch of the one or more texture fetches may indicate a texture to be displayed on the display. The processor may be further configured to, based on the first GPU state data and the second GPU state data, apply a texture value patch to the one or more binary instructions. Applying the texture value patch may translate the one or more binary instructions into one or more translated binary instructions configured to be executed on the second GPU.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system configured to execute instructions for a first graphical processing unit (GPU) on a second GPU, the computing system comprising:
   the second GPU; and
   a processor configured to:
     receive second GPU state data that indicates one or more global properties of the second GPU;
     receive one or more binary instructions for texture operations configured for the first GPU, wherein:
       the one or more binary instructions include one or more texture fetches, and
       each texture fetch includes a texture fetch constant having a respective sign for each of one or more channels that encode coordinates for the texture fetch;
     determine a texture value patch type based at least in part on the one or more signs included in the one or more binary instructions, wherein the texture value patch type is incompatible signs, gamma, depth, or bias; and
     based on the second GPU state data, apply a texture value patch of the texture value patch type to the one or more binary instructions, wherein applying the texture value patch translates the one or more binary instructions into one or more translated binary instructions configured to be executed on the second GPU.

2. The computing system of claim 1, further comprising a display, wherein
   each texture fetch of the one or more texture fetches returns a texture value to be displayed on the display.

3. The computing system of claim 2, wherein each texture fetch of the one or more texture fetches is invoked by instructions that include as arguments a texture ID and the coordinates for the texture fetch.

4. The computing system of claim 2, wherein the texture value patch is an incompatible signs texture value patch configured to translate a texture fetch into a plurality of translated texture fetches.

5. The computing system of claim 2, wherein the texture value patch is a gamma patch configured to convert fetched texture values that are gamma encoded according to a first gamma correction curve of the first GPU and processed in hardware by the second GPU as if they were encoded according to the second gamma correction curve to corrected texture values that are linear or near linear encoded in a first linear encoding space of the first GPU.

6. The computing system of claim 5, wherein the gamma patch converts the texture values at least in part using a lookup table.

7. The computing system of claim 2, wherein the texture fetch constant further includes one or more of a data format, texture edge data, and channel order data.

8. The computing system of claim 1, wherein the one or more global properties of the second GPU include an instruction set architecture (ISA) of the second GPU and/or an application binary interface (ABI) of the second GPU.

9. The computing system of claim 1, wherein the processor is further configured to receive first GPU state data that indicates one or more global properties of the first GPU including an instruction set architecture (ISA) of the first GPU and/or an application binary interface (ABI) of the first GPU, and wherein the texture value patch is applied based at least in part on the one or more global properties of the first GPU.

10. A method for executing instructions for a first graphical processing unit (GPU) on a second GPU, the method comprising:
   receiving second GPU state data that indicates one or more global properties of the second GPU;
   receiving one or more binary instructions for texture operations configured for the first GPU, wherein:
      the one or more binary instructions include one or more texture fetches, and
      each texture fetch includes a texture fetch constant having a respective sign for each of one or more channels that encode coordinates for the texture fetch;
   determining a texture value patch type based at least in part on the one or more signs included in the one or more binary instructions, wherein the texture value patch type is incompatible signs, gamma, depth, or bias; and
   based on the second GPU state data, applying a texture value patch of the texture value patch type to the one or more binary instructions, wherein applying the texture value patch translates the one or more binary instructions into one or more translated binary instructions configured to be executed on the second GPU.

11. The method of claim 10, wherein
   each texture fetch of the one or more texture fetches indicates a texture to be displayed on a display.

12. The method of claim 11, wherein the texture value patch is an incompatible signs texture value patch configured to translate a texture fetch into a plurality of translated texture fetches.

13. The method of claim 11, wherein the texture value patch is a gamma patch configured to convert fetched texture values that are gamma encoded according to a first gamma correction curve of the first GPU and processed in hardware by the second GPU as if they were encoded according to the second gamma correction curve to corrected texture values that are linear or near linear encoded in a first linear encoding space of the first GPU.

14. The method of claim 11, wherein the texture fetch constant further includes one or more of a data format, texture edge data, and channel order data.

15. The method of claim 10, wherein the one or more global properties of the second GPU include an instruction set architecture (ISA) of the second GPU and/or an application binary interface (ABI) of the second GPU.

16. The method of claim 10, wherein the method further comprises receiving first GPU state data that indicates one or more global properties of the first GPU including an instruction set architecture (ISA) of the first GPU and/or an application binary interface (ABI) of the first GPU, and wherein the texture value patch is applied based at least in part on the one or more global properties of the first GPU.

17. A computing system configured to execute instructions for a first graphical processing unit (GPU) on a second GPU, the computing system comprising:
   the second GPU;
   a display; and
   a processor configured to:
      receive first GPU state data that indicates one or more global properties of the first GPU;
      receive second GPU state data that indicates one or more global properties of the second GPU;
      receive one or more binary instructions for texture operations configured for the first GPU, wherein:
         the one or more binary instructions for texture operations include one or more texture fetches,
         each texture fetch includes a texture fetch constant having a respective sign for each of one or more channels that encode coordinates for the texture fetch, and
         each texture fetch of the one or more texture fetches indicates a texture to be displayed on the display;
      determine a texture value patch type based at least in part on the one or more signs included in the one or more binary instructions, wherein the texture value patch type is incompatible signs, gamma, depth, or bias; and
      based on the first GPU state data and the second GPU state data, apply a texture value patch of the texture value patch type to the one or more binary instructions, wherein applying the texture value patch translates the one or more binary instructions into one or more translated binary instructions configured to be executed on the second GPU.

* * * * *